US010602084B2

United States Patent
Mitsunaga et al.

(10) Patent No.: US 10,602,084 B2
(45) Date of Patent: Mar. 24, 2020

(54) IMAGING APPARATUS WHICH PERFORMS COMPRESSIVE SENSING READING DATA FOR A PARTITIONED BLOCK OUTPUT FROM AN IMAGE SENSOR

(71) Applicant: SONY CORPORATION, Tokyo (JP)

(72) Inventors: Tomoo Mitsunaga, Kanagawa (JP); Hayato Wakabayashi, Tokyo (JP); Kenichi Okumura, Tokyo (JP); Yasunobu Hitomi, Kanagawa (JP); Daisuke Iso, Tokyo (JP); Tomonori Masuno, Kanagawa (JP); Shinichiro Izawa, Kanagawa (JP); Kyoko Izuha, Kanagawa (JP); Kouichi Harada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,921

(22) PCT Filed: Jul. 1, 2016

(86) PCT No.: PCT/JP2016/069646
§ 371 (c)(1),
(2) Date: Jan. 4, 2018

(87) PCT Pub. No.: WO2017/010316
PCT Pub. Date: Jan. 19, 2017

(65) Prior Publication Data
US 2018/0205895 A1    Jul. 19, 2018

(30) Foreign Application Priority Data

Jul. 16, 2015    (JP) ................. 2015-141882

(51) Int. Cl.
*H04N 5/345* (2011.01)
*H04N 5/374* (2011.01)
(Continued)

(52) U.S. Cl.
CPC ......... *H04N 5/3456* (2013.01); *H04N 5/2253* (2013.01); *H04N 5/3415* (2013.01);
(Continued)

(58) Field of Classification Search
CPC ...... H04N 5/3456; H04N 5/374; H04N 5/378; H04N 5/2253; H04N 5/3451; H04N 7/181; H04N 5/3415
See application file for complete search history.

(56) References Cited

U.S. PATENT DOCUMENTS 7,271,835 B2 *   9/2007 Iizuka ............... H01L 27/14609
                                                257/E27.132
7,623,172 B2 * 11/2009 Wada ..................... H04N 9/045
                                                348/302
(Continued)

FOREIGN PATENT DOCUMENTS

CN      1774935 A    5/2006
CN    101639922 A    2/2010
(Continued)

OTHER PUBLICATIONS

International Search Report and Written Opinion of PCT Application No. PCT/JP2016/069646, dated Sep. 20, 2016, 11 pages of ISRWO.

*Primary Examiner* — Luong T Nguyen
(74) *Attorney, Agent, or Firm* — Chip Law Group

(57) ABSTRACT

The present disclosure relates to an imaging apparatus comprising an image sensor that includes an imaging surface in which many pixels are arranged vertically and horizontally, a pixel control unit that controls the image sensor, selects a pixel corresponding to a sampling function among pixels configuring a block by applying the sampling function for each block acquired by partitioning the imaging surface of the image sensor into a plurality of blocks, and outputs a sampling signal based on a pixel value of the selected pixel, and a reduced image generating unit that generates a reduced image on the basis of the sampling signal for each block output from the image sensor.

19 Claims, 29 Drawing Sheets

(51) Int. Cl.
*H04N 5/378* (2011.01)
*H04N 7/18* (2006.01)
*H04N 5/225* (2006.01)
*H04N 5/341* (2011.01)

(52) U.S. Cl.
CPC ............ *H04N 5/374* (2013.01); *H04N 5/378* (2013.01); *H04N 7/181* (2013.01)

(56) References Cited

U.S. PATENT DOCUMENTS

| | | | |
|---|---|---|---|
| 7,944,482 B2 * | 5/2011 | Tani | H04N 5/23254 348/222.1 |
| 2005/0259167 A1 * | 11/2005 | Inoue | H04N 5/343 348/300 |
| 2006/0203113 A1 | 9/2006 | Wada et al. | |
| 2008/0024631 A1 | 1/2008 | Tani et al. | |
| 2008/0129855 A1 * | 6/2008 | Vitsnudel | H04N 5/23232 348/302 |
| 2009/0219418 A1 * | 9/2009 | Fujita | H01L 27/14609 348/243 |
| 2015/0334299 A1 * | 11/2015 | Tsuneno | G06K 9/00288 348/36 |

FOREIGN PATENT DOCUMENTS

| | | |
|---|---|---|
| JP | 2004-266369 A | 9/2004 |
| JP | 2008-035279 A | 2/2008 |
| JP | 2010-055594 A | 3/2010 |
| WO | 2004/075564 A1 | 9/2004 |

* cited by examiner

FIG. 8

$$A = \begin{bmatrix} 0 & 0 & 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 & 0 & 0 \\ 0 & 0 & 0 & 1 & 0 & 0 & 0 & 0 & 0 & 0 & 0 & 0 & 0 & 0 \end{bmatrix}$$

FIG. 10

$$A = \begin{bmatrix} \vdots \\ 1\ 0\ 1\ 0\ 0\ 0\ 1\ 0\ 0\ 1\ 0\ 0\ 1\ 0\ 0\ 1 \\ \vdots \end{bmatrix}$$

FIG. 13

$$A = \begin{bmatrix} \vdots \\ 1 & -1 & 0 & 0 & 0 & -1 & 0 & -1 & 0 & 0 & 1 & 0 & -1 & 0 & 0 & 1 \\ \vdots \end{bmatrix}$$

FIG. 17

$$A = \begin{bmatrix} 1 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 1 \end{bmatrix}$$

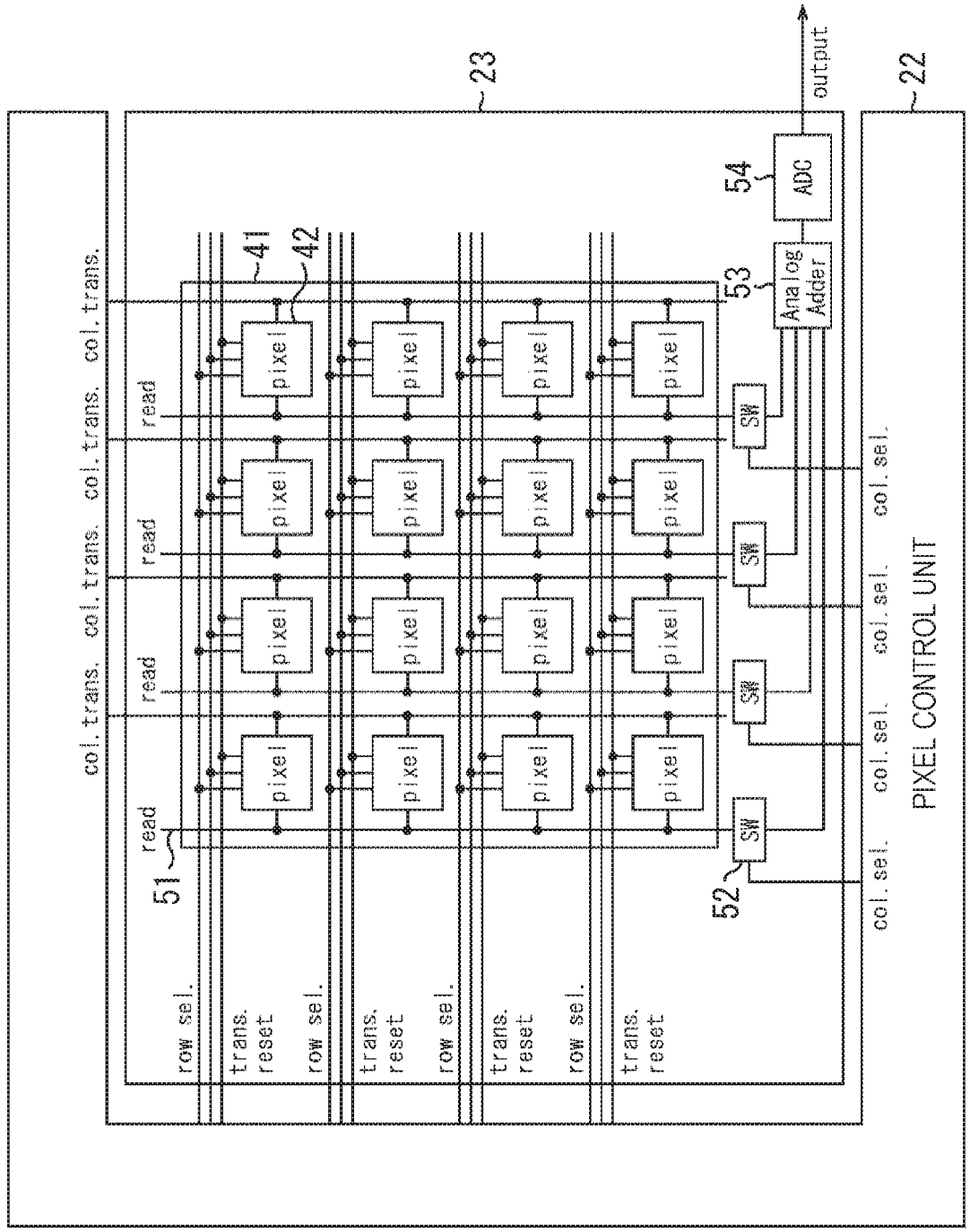

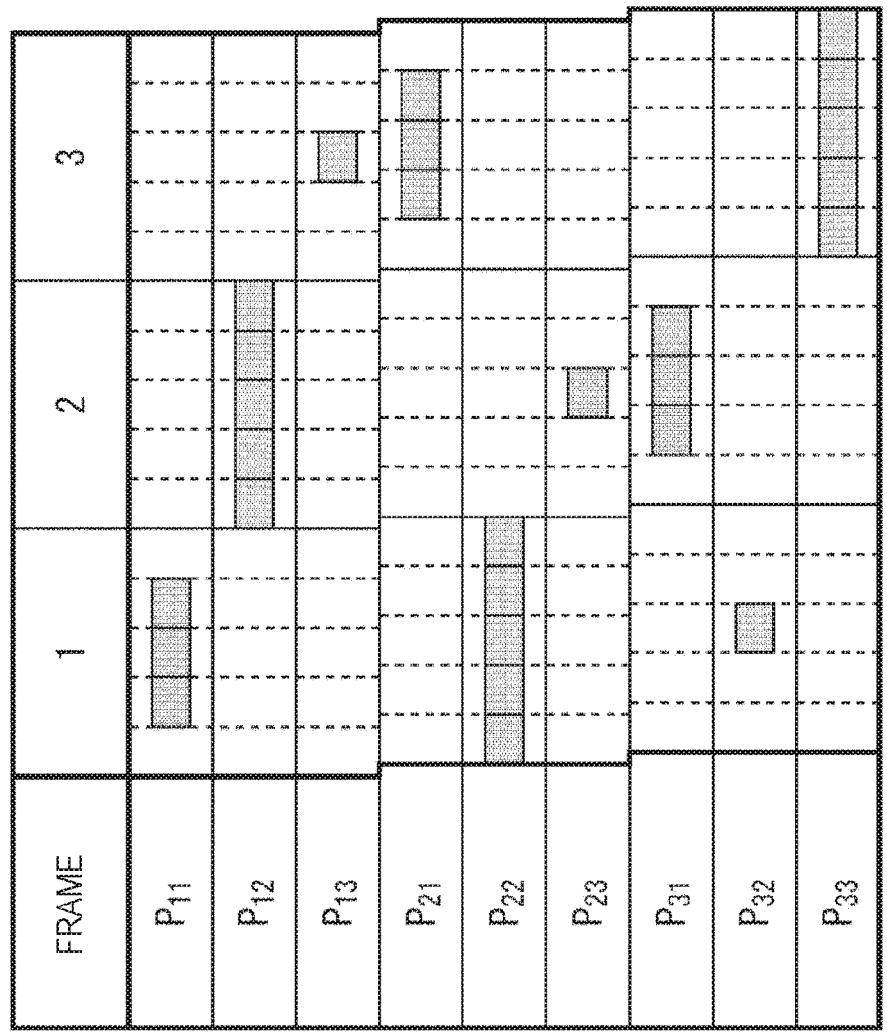

FIG. 24

$$A = \begin{bmatrix} 0 & 0 & 0 & 0 & 1 & 0 & 0 & 0 & 0 \\ 1 & 0 & 0 & 0 & 1 & 0 & 0 & 0 & 0 \\ 1 & 0 & 0 & 0 & 1 & 0 & 0 & 1 & 0 \\ 1 & 0 & 0 & 0 & 1 & 0 & 0 & 0 & 0 \\ 0 & 0 & 0 & 0 & 1 & 0 & 0 & 0 & 0 \\ 0 & 1 & 0 & 0 & 0 & 0 & 0 & 0 & 0 \\ 0 & 1 & 0 & 0 & 0 & 0 & 1 & 0 & 0 \\ 0 & 1 & 0 & 0 & 0 & 1 & 1 & 0 & 0 \\ 0 & 1 & 0 & 0 & 0 & 0 & 1 & 0 & 0 \\ 0 & 1 & 0 & 0 & 0 & 0 & 0 & 0 & 0 \\ 0 & 0 & 0 & 0 & 0 & 0 & 0 & 0 & 1 \\ 0 & 0 & 0 & 1 & 0 & 0 & 0 & 0 & 1 \\ 0 & 0 & 1 & 1 & 0 & 0 & 0 & 0 & 1 \\ 0 & 0 & 0 & 1 & 0 & 0 & 0 & 0 & 1 \\ 0 & 0 & 0 & 0 & 0 & 0 & 0 & 0 & 1 \end{bmatrix}$$

FIG. 25

| FRAME | 1 | 2 | 3 |
|---|---|---|---|
| $P_{11}$ | ▨ | | |
| $P_{12}$ | | ▨ | |
| $P_{13}$ | | | ▨ |
| $P_{21}$ | | | ▨ |
| $P_{22}$ | ▨ | | |
| $P_{23}$ | | ▨ | |
| $P_{31}$ | | ▨ | |
| $P_{32}$ | ▨ | | |
| $P_{33}$ | | | ▨ |

FIG. 26

$$A = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 1 & 0 \\ 3 & 0 & 0 & 0 & 0 & 0 & 0 & 0 & 0 \\ 0 & 0 & 0 & 0 & 5 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 1 & 0 & 0 & 0 \\ 0 & 0 & 0 & 0 & 0 & 0 & 3 & 0 & 0 \\ 0 & 5 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 1 & 0 & 0 & 0 & 0 & 0 & 0 \\ 0 & 0 & 0 & 3 & 0 & 0 & 0 & 0 & 0 \\ 0 & 0 & 0 & 0 & 0 & 0 & 0 & 0 & 5 \end{bmatrix}$$

FIG. 28

IMAGING APPARATUS WHICH PERFORMS COMPRESSIVE SENSING READING DATA FOR A PARTITIONED BLOCK OUTPUT FROM AN IMAGE SENSOR

CROSS REFERENCE TO RELATED APPLICATIONS

This application is a U.S. National Phase of International Patent Application No. PCT/JP2016/069646 filed on Jul. 1, 2016, which claims priority benefit of Japanese Patent Application No. JP 2015-141882 filed in the Japan Patent Office on Jul. 16, 2015. Each of the above-referenced applications is hereby incorporated herein by reference in its entirety.

TECHNICAL FIELD

The present disclosure relates to an imaging apparatus and an information processing system, and more particularly, to an imaging apparatus and an information processing system that are appropriate for the use of a case where videos, for example, captured by a plurality of cameras are aggregated and analyzed.

BACKGROUND ART

Generally, as a security system used for detecting a suspicious person approaching a predetermined place or an analysis system analyzing the behaviors of workers in a factory or shopping guests in a store, systems have been proposed in which videos captured by multiple cameras are aggregated in a server through a network and are analyzed by the server.

For example, in Patent Document 1, a system capable of analyzing the behaviors of shopping guests in a store has been disclosed. In this system, videos supplied from cameras arranged in a plurality of areas are aggregated in a server through a network, and moving lines of in-store guests projected inside the videos are calculated and recorded in the server. In this server, a registrant database used for registering face images, a face detection engine detecting a face image from videos supplied from a plurality of cameras, and a face authentication engine collating the face image detected by the face detection engine with face images registered in the registrant database are provided, and a mechanism for identifying a person projected in a video through collation of face images and calculating the moving line and classifying moving line analysis information calculated using sex and age groups that can be determined from the face images can be provided.

CITATION LIST

Patent Document

Patent Document 1: Japanese Patent Application Laid-Open No. 2010-55594

SUMMARY OF THE INVENTION

Problems to be Solved by the Invention

In the system described above or the like, in a case where the number of cameras is increased, or the image quality of videos is improved for improving the accuracy of a behavior analysis, congestion may occur in the bandwidth of the network.

However, it is preferable that the amount of data of videos and the like transmitted through a network is small to a degree not degrading the accuracy of a behavior analysis. In addition, in a case where the number of cameras is increased, the power consumption thereof increases in proportion to the number of the cameras, and accordingly, it is preferable to suppress the power consumption of each camera.

The present disclosure is in consideration of such situations, and enables a decrease in the amount of data of videos and the like transmitted through a network and suppression of power consumption of each camera (imaging apparatus).

Solutions to Problems

An imaging apparatus which is a first aspect of the present disclosure includes: an image sensor that includes an imaging surface in which many pixels are arranged vertically and horizontally; a pixel control unit that controls the image sensor, selects a pixel corresponding to a sampling function among pixels configuring a block by applying the sampling function for each block acquired by partitioning the imaging surface of the image sensor into a plurality of blocks, and outputs a sampling signal based on a pixel value of the selected pixel; and a reduced image generating unit that generates a reduced image on the basis of the sampling signal for each block output from the image sensor.

The image sensor may select one pixel corresponding to the sampling function among the pixels configuring the block and output a pixel value of the selected one pixel as the sampling signal in accordance with control from the pixel control unit.

The image sensor may select one pixel corresponding to the sampling function among the pixels configuring the block in accordance with a row selection signal and a column selection signal supplied from the pixel control unit.

Each pixel of the image sensor may include a multi-bit transfer switch that performs switching on the basis of the row selection signal and the column selection signal supplied from the pixel control unit.

The image sensor randomly may select one pixel among the pixels configuring the block in space and time in accordance with a row selection signal and a column selection signal supplied from the pixel control unit.

The image sensor may select a plurality of pixels corresponding to the sampling function among the pixels configuring the block and output an added value acquired by adding pixel values of the plurality of selected pixels as the sampling signal in accordance with control from the pixel control unit.

The image sensor may include: an analog adder that adds pixel values of the pixels selected according to the row selection signal and the column selection signal supplied from the pixel control unit for each row; and an ADC unit that sequentially adds outputs of each row from the analog adder as digital values.

Each pixel of the image sensor may include a multi-bit transfer switch that performs switching on the basis of the row selection signal and the column selection signal supplied from the pixel control unit.

The image sensor randomly may select a plurality of pixels among the pixels configuring the block in space and time in accordance with a row selection signal and a column selection signal supplied from the pixel control unit.

The image sensor may select a plurality of pixels corresponding to the sampling function among the pixels configuring the block and output an added value acquired by adding pixel values of the plurality of selected pixels with a positive or negative sign added as the sampling signal in accordance with control from the pixel control unit.

The image sensor may include: an analog adder that adds pixel values of the pixels selected according to the row selection signal and the column selection signal supplied from the pixel control unit for each row; a sign inverter that inverts sign of an output from the analog adder; and an ADC unit that sequentially adds outputs of each row from the analog adder or the sign inverter as digital values.

Each pixel of the image sensor may include a multi-bit transfer switch that performs switching on the basis of the row selection signal and the column selection signal supplied from the pixel control unit.

The image sensor randomly may select a plurality of pixels among the pixels configuring the block in space and time in accordance with the row selection signal and the column selection signal supplied from the pixel control unit.

The pixel control unit may control the image sensor, select a pixel corresponding to a common sampling function among pixels configuring a block by applying the common sampling function for each block acquired by partitioning the imaging surface of the image sensor into a plurality of blocks, and output a sampling signal based on a pixel value of the selected pixel; and the reduced image generating unit may generate the reduced image on the basis of the sampling signal for each block, to which the common sampling function is applied, output from the image sensor.

The pixel control unit may control the image sensor, select a pixel corresponding to a common sampling function or a non-common sampling function among pixels configuring a block by applying the common sampling function or the non-common sampling function other than the common sampling function for each block acquired by partitioning the imaging surface of the image sensor into a plurality of blocks, and output a sampling signal based on a pixel value of the selected pixel; and the reduced image generating unit may generate the reduced image by resampling the sampling signal on the basis of the common sampling function, from a storage unit storing the sampling signal of each block, to which the common sampling function or the non-common sampling function is applied, output from the image sensor.

The imaging apparatus which is the first aspect of the present disclosure, further includes a feature detecting unit that performs a feature detecting process for the reduced image.

The imaging apparatus which is the first aspect of the present disclosure, further includes an area cutting-out unit that cuts out the sampling signal of each block corresponding to an area in which a feature is detected by the feature detecting process from an output of the image sensor and outputs the cut-out sampling signal to a later stage.

The area cutting-out unit may cut out an area in which a feature is detected by the feature detecting process from the reduced image formed from the output of the image sensor and output the cut-out area to a later stage.

The pixel control unit may control the image sensor, select a pixel corresponding to a common sampling function or a non-common sampling function among pixels configuring a block by applying the non-common sampling function other than the common sampling function for a block corresponding to an area in which a feature is detected by the feature detecting process among blocks acquired by partitioning the imaging surface of the image sensor into a plurality of blocks and applying the common sampling function for a block corresponding to an area in which a feature is not detected by the feature detecting process, and output a sampling signal based on a pixel value of the selected pixel, and the area cutting-out unit may cut out the sampling signal of the block, to which the non-common sampling function is applied, corresponding to an area in which a feature is detected by the feature detecting process from the output of the image sensor and output the cut-out sampling signal to a later stage.

According to a first aspect of the present disclosure, the image sensor is controlled, a pixel corresponding to a sampling function is selected among pixels configuring a block by applying the sampling function for each block acquired by partitioning the imaging surface of the image sensor into a plurality of blocks, and a sampling signal based on a pixel value of the selected pixel is output, and a reduced image is generated on the basis of the sampling signal for each block output from the image sensor.

An information processing system which is a second aspect of the present disclosure includes: one or more imaging apparatuses; and an information processing apparatus connected to the imaging apparatuses through a network, in which the imaging apparatus includes: an image sensor that includes an imaging surface in which many pixels are arranged vertically and horizontally; a pixel control unit that controls the image sensor, selects a pixel corresponding to a sampling function among pixels configuring a block by applying the sampling function for each block acquired by partitioning the imaging surface of the image sensor into a plurality of blocks, and outputs a sampling signal based on a pixel value of the selected pixel; a reduced image generating unit that generates a reduced image on the basis of the sampling signal for each block output from the image sensor; a feature detecting unit that performs a feature detecting process for the reduced image; and an area cutting-out unit that cuts out the sampling signal of each block corresponding to an area in which a feature is detected by the feature detecting process from an output of the image sensor and transmits the cut-out sampling signal to the information processing apparatus through the network; and the information apparatus includes an information processing unit that performs a predetermined information process for the output of the information processing apparatus transmitted through the network.

According to an information processing system that is a second aspect of the present disclosure, the image sensor is controlled by the imaging apparatus, a pixel corresponding to a sampling function is selected among pixels configuring a block by applying the sampling function for each block acquired by partitioning the imaging surface of the image sensor into a plurality of blocks, a sampling signal based on a pixel value of the selected pixel is output, a reduced image on the basis of the sampling signal for each block output from the image sensor is generated, a feature detecting process is performed for the reduced image, and the sampling signal of each block corresponding to an area in which a feature is detected by the feature detecting process is cut out from an output of the image sensor and is transmitted to the information processing apparatus through the network. In addition, a predetermined information process is performed for the output of the information processing apparatus transmitted through the network by the information apparatus.

Effects of the Invention

According to the first embodiment of the present disclosure, the amount of data transmitted to an information processing apparatus through a network can be decreased.

In addition, according to the first embodiment of the present disclosure, the power consumption of an imaging apparatus can be suppressed.

According to the second embodiment of the present disclosure, the amount of data transmitted to an information processing apparatus through a network can be decreased, and the power consumption of an imaging apparatus can be suppressed.

BRIEF DESCRIPTION OF DRAWINGS

FIG. 8 is a diagram that illustrates an example of a sampling function.

FIG. 10 is a diagram that illustrates an example of a sampling function.

FIG. 13 is a diagram that illustrates an example of a sampling function.

FIG. 17 is a diagram that illustrates an example of a sampling function.

FIG. 22 is a block diagram that illustrates a configuration example (third configuration example) of an image sensor corresponding to the second configuration example of a pixel.

FIGS. 23A and 23B are timing diagrams that illustrate a sampling function that can be applied to the first configuration example of a pixel and the first configuration example of the image sensor corresponding thereto.

FIG. 24 is a diagram that illustrates a sampling function of a matrix notation corresponding to the timing diagram illustrated in FIGS. 23A and 23B.

FIG. 25 is a timing diagram that illustrates a sampling function that can be applied to the second configuration example of a pixel and a third configuration example of the image sensor corresponding thereto.

FIG. 26 is a diagram that illustrates a sampling function of a matrix notation corresponding to the timing diagram illustrated in FIG. 25.

FIG. 28 is a diagram that illustrates an example of a sampling function that can be applied to the third configuration example of a pixel and an image sensor corresponding thereto.

MODE FOR CARRYING OUT THE INVENTION

Hereinafter, preferred embodiments (hereinafter, referred to as embodiments) for performing the present disclosure will be described in detail with reference to the drawings.

<Configuration Example of Camera Monitoring System as Embodiment of Present Disclosure>

Figure 1:
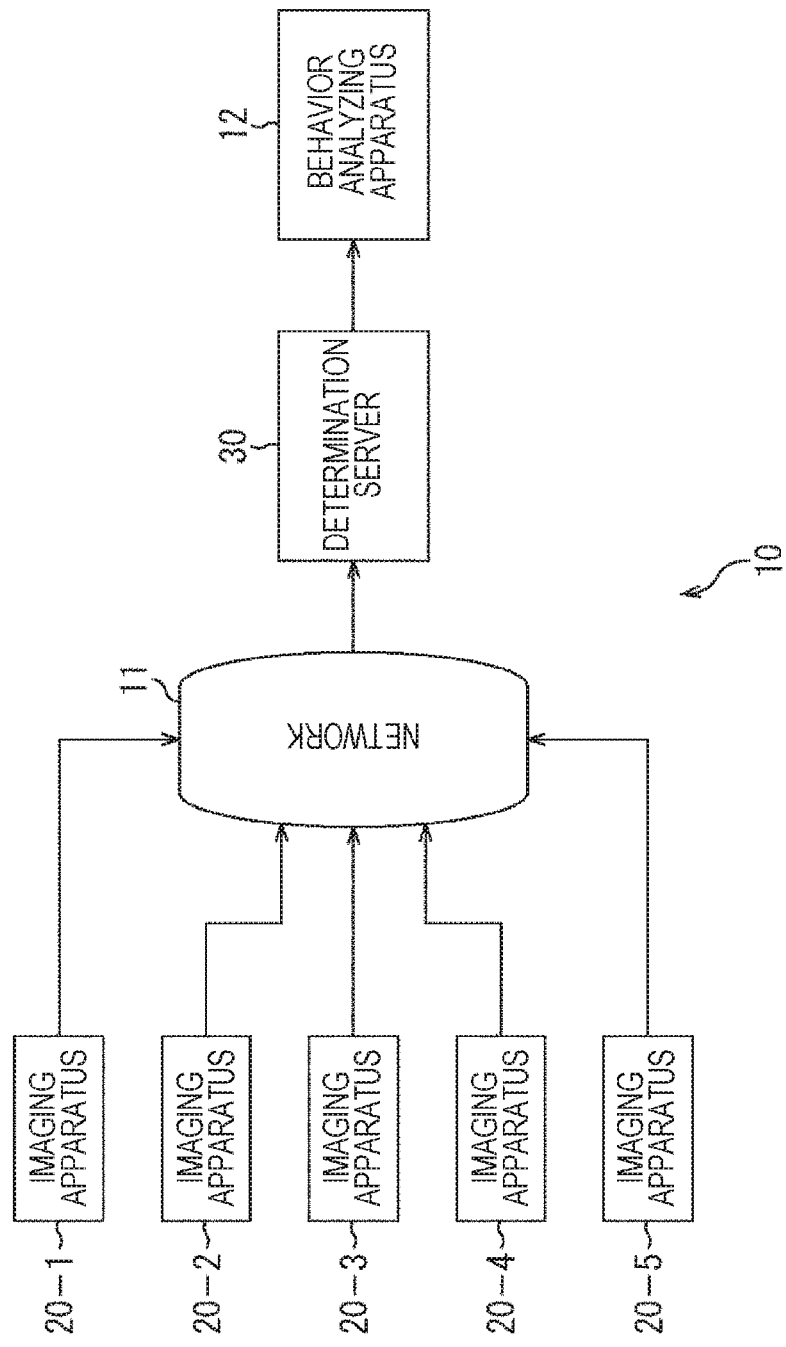
FIG. 1 is a block diagram that illustrates a first configuration example of a camera monitoring system according to the present disclosure.

FIG. 1 illustrates a configuration example of a camera monitoring system that is an embodiment of the present disclosure.

This camera monitoring system 10 is configured by a plurality of imaging apparatuses 20, a determination server 30, and a behavior analyzing apparatus 12. Note that, in the case of FIG. 1, while five imaging apparatuses 20 are illustrated, the number of imaging apparatuses 20 may be arbitrarily increased or decreased according to the scale of facilities or the like to which the camera monitoring system 10 is applied.

Each imaging apparatus 20 is connected to the determination server 30 through a network 11, and the output thereof is transmitted to the determination server 30 through the network 11.

The imaging apparatus 20 can perform compressive sensing (CS) reading in addition to ordinary reading (by driving all the pixels of an image sensor mounted in the imaging apparatus 20, a whole image formed by pixel signals of all the pixels is acquired).

Here, the CS reading represents an operation of partitioning the imaging surface of an image sensor mounted in the imaging apparatus 20 into blocks each having a predetermined size, driving only pixels that are randomly selected on the basis of a sampling function (to be described later in detail) among pixels included in a block for each partitioned block, and generating and outputting one value (hereinafter, referred to as CS data) by performing a predetermined arithmetic operation for pixel signals acquired by the driven pixels. Thus, when the CS reading is performed, CS data can be acquired from each block acquired by partitioning the imaging surface of the image sensor.

In a case where the CS reading is performed in the imaging apparatus 20, compared to a case where ordinary reading is performed, the number of pixels to be driven can be decreased, and accordingly, the power consumption can be suppressed. In addition, the amount of data transmitted to the determination server 30 through the network 11 can be decreased.

In addition, the imaging apparatus 20 directly performs feature detection (detection of an area in which a person, a face, or the like is present) from the CS data acquired by the CS reading, cuts out only CS data of areas in which a person, a face, or the like is detected, and transmits the cut-out CS data to the determination server 30 through the network 11.

In addition, the imaging apparatus 20 may cut out pixel signals of the areas in which a person, a face, or the like is detected and transmit the cut-out pixel signals to the determination server 30 through the network 11. Accordingly, the determination server 30 or the like disposed in a later stage can also perform a video analysis requiring a finer video, such as detection of a person's expression or the like.

The determination server 30 reconfigures an image from the CS data of the areas, in which a person, a face, or the like is detected, transmitted from the imaging apparatus 20 through the network 11 and performs an identification determining process for the reconfigured image.

The behavior analyzing apparatus 12 performs a behavior analyzing process and the like of a person that is an object on the basis of a result of the identification determining process performed by the determination server 30.

<First Configuration Example of Imaging Apparatus 20 and Determination Server 30>

Figure 2:
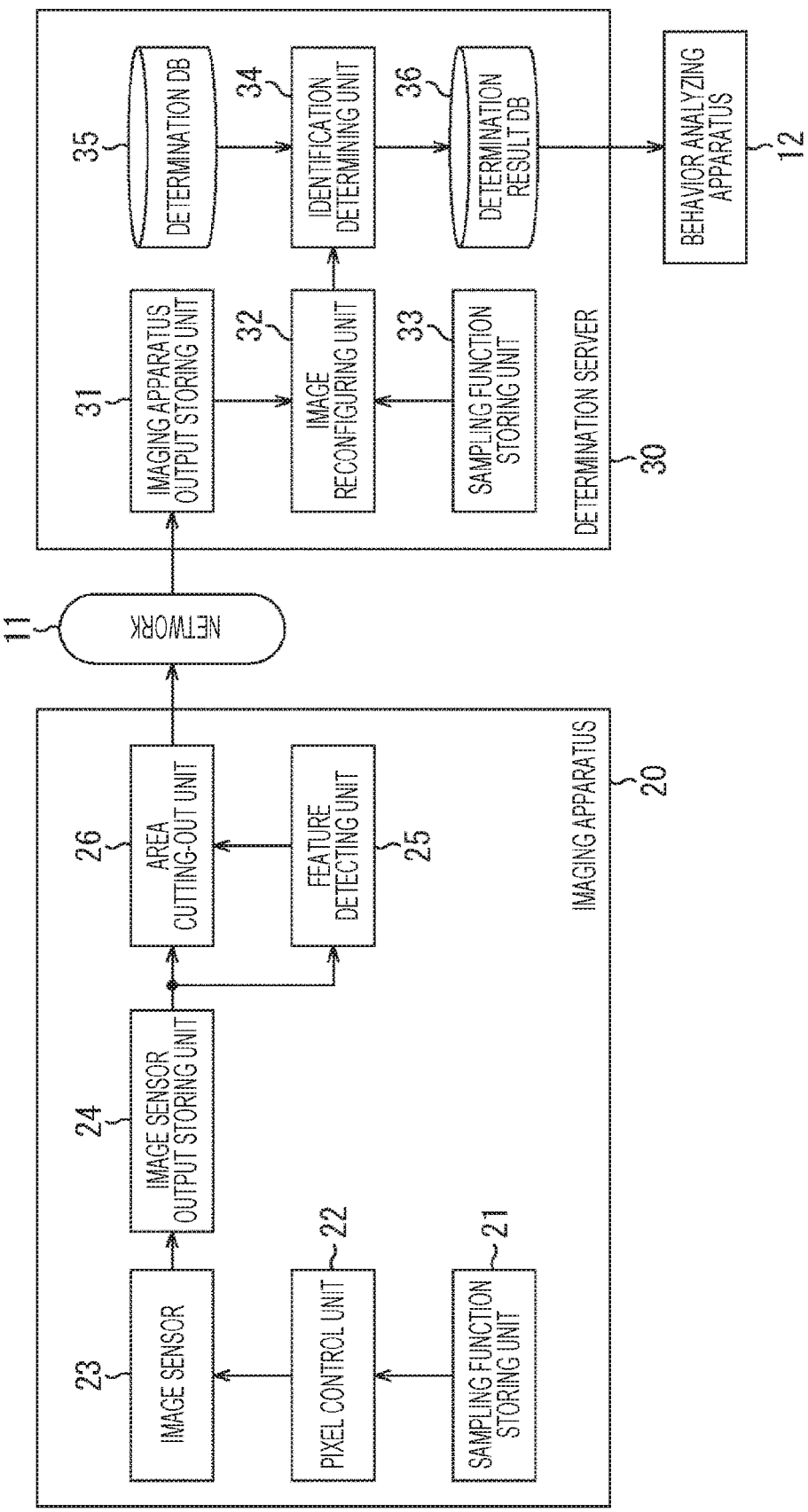
FIG. 2 is a block diagram that illustrates a first configuration example of an imaging apparatus and a determination server.

Next, FIG. 2 illustrates a first configuration example of the imaging apparatus 20 and the determination server 30. Note that, in FIG. 2, although only one imaging apparatus 20 is illustrated, actually, a plurality of imaging apparatuses 20 are connected to the determination server 30 through the network 11.

The imaging apparatus 20 of the first configuration example is configured by a sampling function storing unit 21, a pixel control unit 22, an image sensor 23, an image sensor output storing unit 24, a feature detecting unit 25, and an area cutting-out unit 26.

The sampling function storing unit 21 stores a plurality of different sampling functions and supplies a stored sampling function to the pixel control unit 22 in response to a request from the pixel control unit 22.

The sampling function is matrix data or data of a format having a meaning equivalent to the matrix data representing the positions of pixels to be driven among pixels included in each block partitioning the imaging surface of the image sensor 23. Note that, in the imaging apparatus 20 of the first configuration example, a common sampling function is applied to all the blocks of the image sensor 23.

The pixel control unit 22 controls the driving (exposing and reading each pixel) of the image sensor 23. More specifically, the pixel control unit 22 drives corresponding pixels by applying a common sampling function to each block of the image sensor 23, thereby controlling the CS reading of the image sensor 23.

The image sensor 23 generates CS data for each block by driving pixels and the like in accordance with the control from the pixel control unit 22 and simultaneously or sequentially outputs the generated CS data for each block to the image sensor output storing unit 24.

The image sensor output storing unit 24 stores the CS data for each block that is input from the image sensor 23. Note that, the CS data for each of all the blocks stored in the image sensor output storing unit 24 is acquired by applying a common sampling function and thus can be regarded as a reduced image of an image acquired in a case where all the pixels of the image sensor 23 are driven. Thus, hereinafter, the CS data of each block acquired by applying a common sampling function, which is stored in the image sensor output storing unit 24, will be also referred together to as a reduced image.

The feature detecting unit 25 performs a feature detecting process of, for example, detecting areas having features such as a person or a face for a reduced image stored in the image sensor output storing unit 24 as a target and notifies the areas in which a person, a face, or the like is detected to the area cutting-out unit 26. The area cutting-out unit 26 cuts out only areas in which features are detected from the reduced image stored in the image sensor output storing unit 24 in accordance with the notification from the feature detecting unit 25 and transmits the areas to the determination server 30 through the network 11.

Note that, an existing technique may be applied to the feature detecting process performed by the feature detecting unit 25. For example, a detection technique may be applied in which a plurality of templates each having a structure in which partial tone patterns or the like of a face and an appearance of a person are rough are generated in advance using a statistical (learning) technique, and the degrees of match between a reduced image and such templates are summed for detection. According to this technique, feature detection is performed on the basis of a rough structure, and thus, it is easy to detect a feature also from a reduced image.

More specifically, in the image sensor 23, for example, by applying four different types of sampling functions per frame to acquire four reduced images, and, in a feature detecting process, four types of templates that have been learned in advance are prepared for each sampling function. Then, the degree of match with learned templates is investigated for each input reduced image, and the possibility of an object desired to be detected (for example, a person) is determined for each block. The result of this determination is stored as bitmap images corresponding to the number of blocks, and in determination of a reduced image corresponding to a next different sampling function, the stored bitmap images are referred to, and only areas detected in the determination for the previous reduced image are regarded as targets for which the degree of match with the templates is investigated. Accordingly, the amount of the feature detecting process can be decreased.

Meanwhile, the determination server 30 of the first configuration example, for example, reconfigures the whole image from the CS data transmitted from each imaging apparatus 20 as preliminary information of a moving line analysis of an object and performs an identification determining process by collating the reconfigured whole images with each other or by performing collation with a past history stored in a determination database. In addition, the CS data transmitted to the determination server 30 is data for which the feature deterring process (for example, a face detecting process or the like) has already been performed on the imaging apparatus 20 side, and thus, a high-load process such as a process of searching a person from a large amount of video data does not need to be performed in the determination server 30, and the identification determining process can be focused on.

However, since the CS data of the areas in which features are detected is cut out from the reduced image and is transmitted to the determination server 30, and accordingly, before the identification determining process is performed, a process of reconfiguring the whole image from the CS data, which is similar to the output at the time of ordinary reading, is necessary. In addition, according to the principle of CS, it is known that the whole image can be reconfigured by using a sampling function that is the same as the sampling function applied by the imaging apparatus 20.

The determination server 30 is configured by an imaging apparatus output storing unit 31, an image reconfiguring unit 32, a sampling function storing unit 33, an identification determining unit 34, a determination database (DB) 35, and a determination result DB 36.

In the imaging apparatus output storing unit 31, CS data of area cut out from a reduced image, which is transmitted from the plurality of imaging apparatuses 20 through the network 11, is stored. The image reconfiguring unit 32 acquires the same sampling function as the sampling function used by the imaging apparatus 20 at the time of performing CS reading from the sampling function storing unit 33. In addition, the image reconfiguring unit 32 restores, on the basis of the sampling function, the whole image from CS data of areas cut out from a reduced image that is stored in the imaging apparatus output storing unit 31.

The sampling function storing unit 33, similar to the sampling function storing unit 33 of the imaging apparatus 20, stores a plurality of sampling functions and supplies a sampling function in response to a request from the image reconfiguring unit 32. The identification determining unit 34 performs an identification determining process of faces and the like that have already been detected by collating whole images, which are reconfigured, supplied from each imaging apparatus 20 with each other or performing collation with a past history stored in the determination DB 35 and registers a result of the determination in the determination result DB 36. In addition, the result of the identification determination that is registered in the determination result DB 36 is used as preliminary information of the same line analyzing process for an object performed by the behavior analyzing apparatus 12.

<Detailed Configuration Example of Image Sensor 23>

Figure 3:
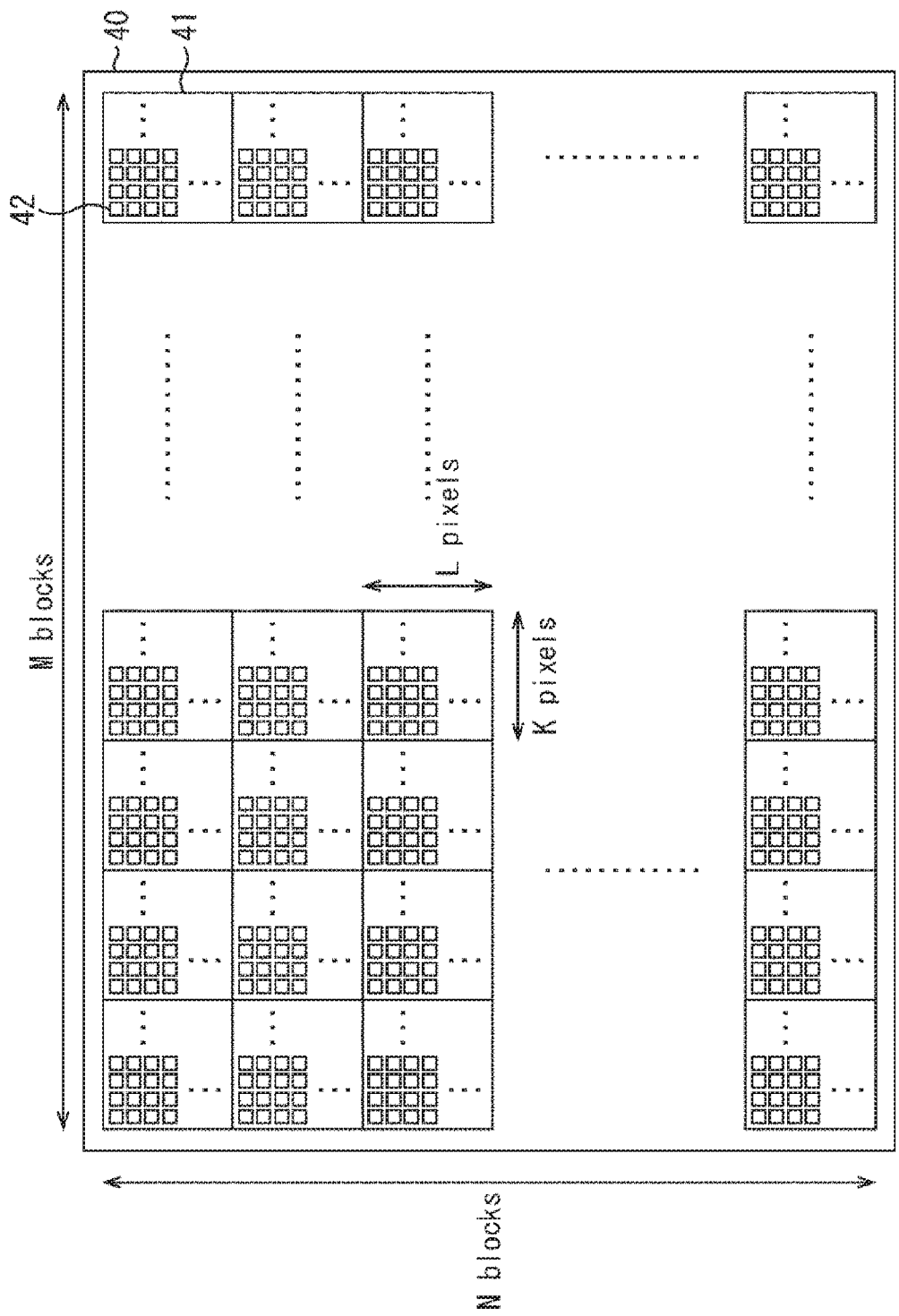
FIG. 3 is a diagram that illustrates a state in which an imaging surface of an image sensor is partitioned in units of blocks.

Next, FIG. 3 illustrates a state in which the imaging surface of the image sensor 23 is partitioned in units of blocks.

As illustrated in the drawing, on the imaging surface 40 of the image sensor 23, many pixels 42 converting incident light into electric signals are arranged in a two-dimensional lattice pattern. The imaging surface 40 is partitioned into M×N blocks in units of blocks each formed by K×L pixels.

<First Configuration Example of Pixel 42>

Figure 4:
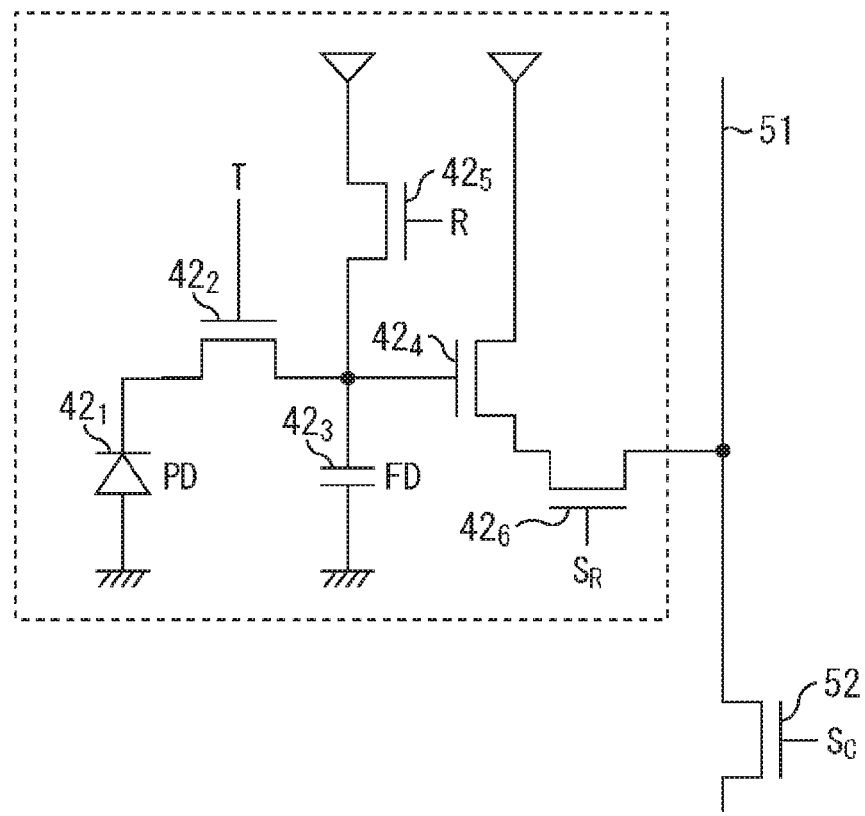
FIG. 4 is an equivalent circuit diagram that corresponds to a first configuration example of a pixel.

FIG. 4 illustrates an equivalent circuit corresponding to a first configuration example of a pixel 42 arranged on the imaging surface 40 of the image sensor 23.

In the pixel 42, a photodiode (PD) $42_1$ converting incident light into an electric signal through a photoelectric conversion is formed, and, a floating diffusion (FD) $42_3$ is connected to the PD $42_1$ through a transfer switch $42_2$.

The FD $42_3$ is connected to the gate of a reading AMP $42_4$, and the reading AMP $42_4$ is connected to a reading signal line 51 through a row selection switch $42_6$. In addition, the FD $42_3$ is connected also to a reset switch $42_5$. The reading signal line 51 is connected to a column selection switch 52 outside the pixel 42.

In the first configuration example of the pixel 42, when a transfer signal T is applied to the transfer switch $42_2$, electric charge accumulated in the PD $42_1$ is transmitted to the FD $42_3$. Next, when SR is applied to the row selection switch $42_6$, and simultaneously when a column selection signal $S_C$ is applied to the column selection switch 52, the electric potential of the FD $42_3$ is amplified by the reading amplifier $42_4$, and the amplified signal is read from the reading signal line 51. In addition, when a reset signal R is applied to the reset switch $42_5$, the electric potential of the FD $42_3$ is reset to the electric potential of the power source.

<First Configuration Example of Image Sensor 23>

Figure 5:
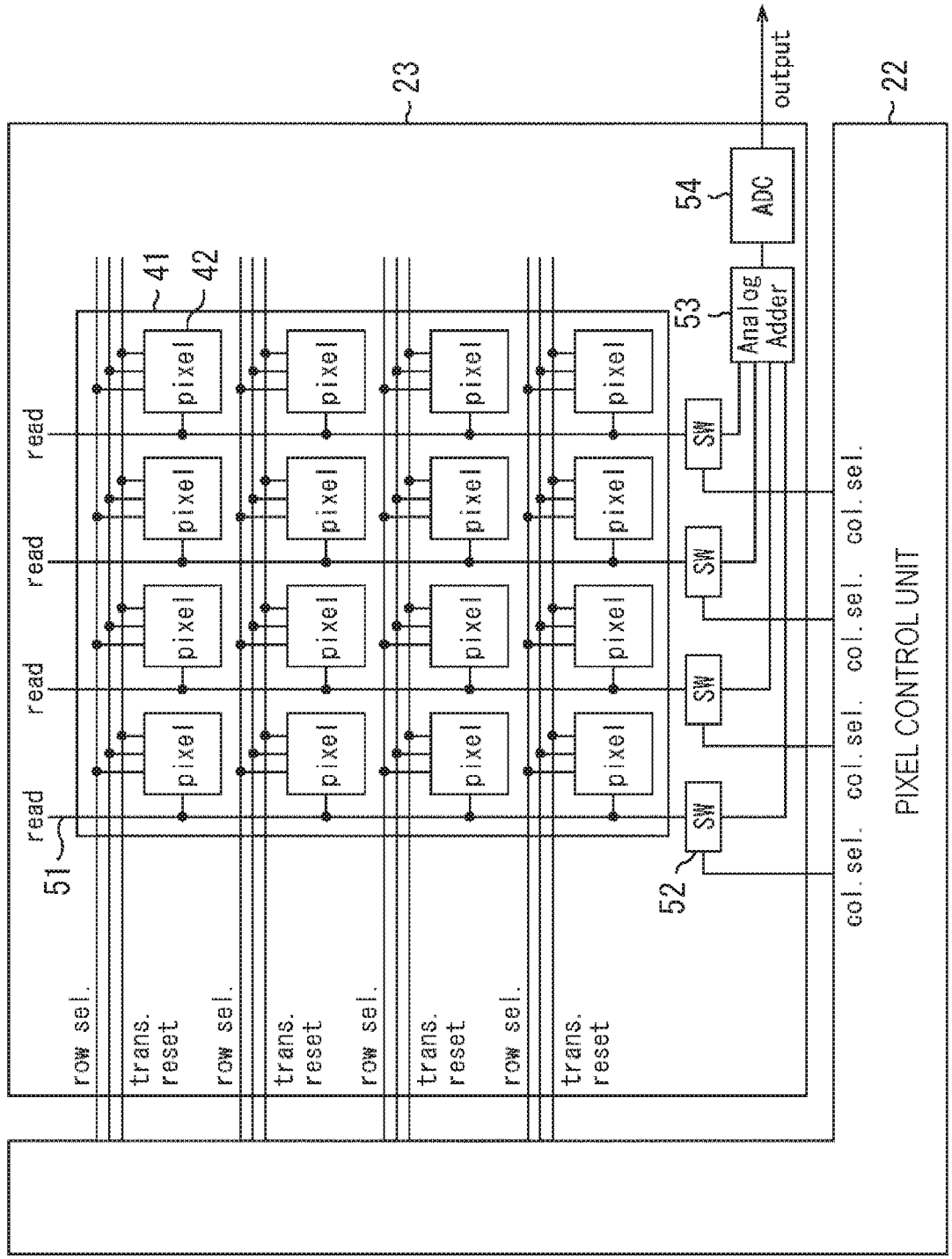
FIG. 5 is a block diagram that illustrates a first configuration example of an image sensor.

FIG. 5 illustrates a first configuration example of the image sensor 23. However, the drawing only illustrates one block 41 acquired by partitioning the imaging surface 40 into M×N blocks and a pixel control signal line, a pixel signal reading line, and peripheral circuits connected thereto, and a case is illustrated in which 16 (=4×4) pixels are included in the block 41.

All the pixels 42 disposed inside the image sensor 23 are driven according to control signals notified from the pixel control unit 22 through row selection signal lines (row sel.), transfer signal lines (trans.), column selection signal lines (col.sel.), and reset signal lines (reset).

Here, pixels belonging to the same row share the row selection signal line, the transfer signal line, and the reset signal line. A common reading signal line (read) 51 is connected to pixels belonging to the same column, and the column selection signal line controls the reading signal line 51 of a corresponding column by using the column selection switch 52. Accordingly, each pixel 42 is controlled to be a reading target of a pixel signal or not in accordance with X-Y addressing using the row selection signal line and the column selection signal line.

In addition, all the pixels 42 belonging to the same block 41 are connected to an analog adder 53 arranged for each block through the reading signal line 51 and the column selection switch (SW) 52 that are common in units of columns. An ADC 54 is arranged for each block at a later stage of the analog adder 53.

In the first configuration example of the image sensor 23, a pixel signal of the pixel 42 selected by the row selection signal line and the column selection signal line is read by the reading signal line 51 wired for each column. The pixel signals read at the same timing are added by the analog adder 53, and the output of the analog adder 53 is sequentially added by the ADC 54 as digital data.

<Output of Image Sensor 23>

Figure 6:
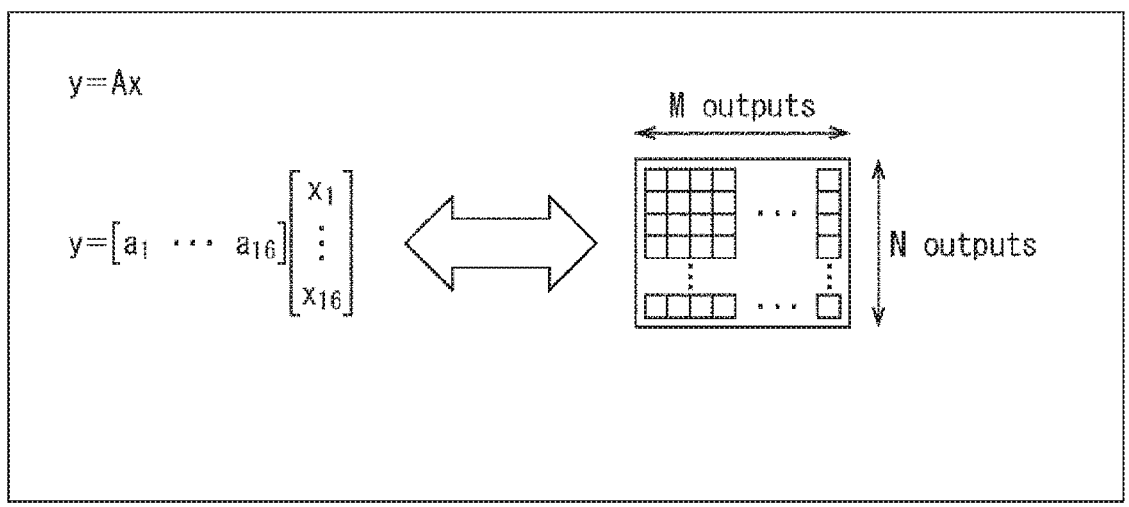
FIG. 6 is a diagram that illustrates a relation among a sampling function, an output value of each block, and an output data format of an image sensor.

Next, FIG. 6 illustrates a relation among a sampling function, an output value of each block, and an output data format of an image sensor.

As described above, pixels of which pixel signals are read and added among the pixels included in a block are controlled using a sampling function. In other words, the pixel control unit 22 generates and outputs a row selection signal, a column selection signal, and a reset signal on the basis of the sampling function.

Hereinafter, a case where K×L pixels configuring one block are 4×4 pixels will be described as an example. In a case where pixel values of pixels of a certain block is $x=[x_1, x_2, \ldots, x_{16}]$, a sampling function applied to the block is $A=[a_1, a_2, \ldots, a_{16}]$, and the output value of the block, in other words, CS data is y, such a relation, as illustrated in FIG. 6, is $y=Ax$, and one output value y of the block is determined in correspondence with one row vector of the sampling function.

In the image sensor 23, at a certain time, the sampling function A that is common to all the blocks 41 is applied, and an output value y at that time is acquired from each block 41. In addition, since the signal output lines from the ADC 54 in the image sensor 23 are separated for each block, by performing control that is synchronous for all the blocks 41, one output value y can be acquired simultaneously from each of all the blocks 41. In other words, M×N output values y having a two-dimensional array pattern can be acquired.

Here, while the sampling function A can be regarded as a resampling filter of an arbitrary coefficient for 4×4 pixels configuring the block 41, the common sampling function is applied to all the blocks 41, and accordingly, M×N output values y output from all the blocks 41 is data for which certain common resampling is performed on M×N two-dimensional lattice points from the whole image. Accordingly, the M×N output values y can be regarded as a reduced image of M×N pixels.

The pixel control unit 22 and the image sensor 23 can perform the operation described above continuously in a time series while switching among sampling functions A is performed.

Figure 7:
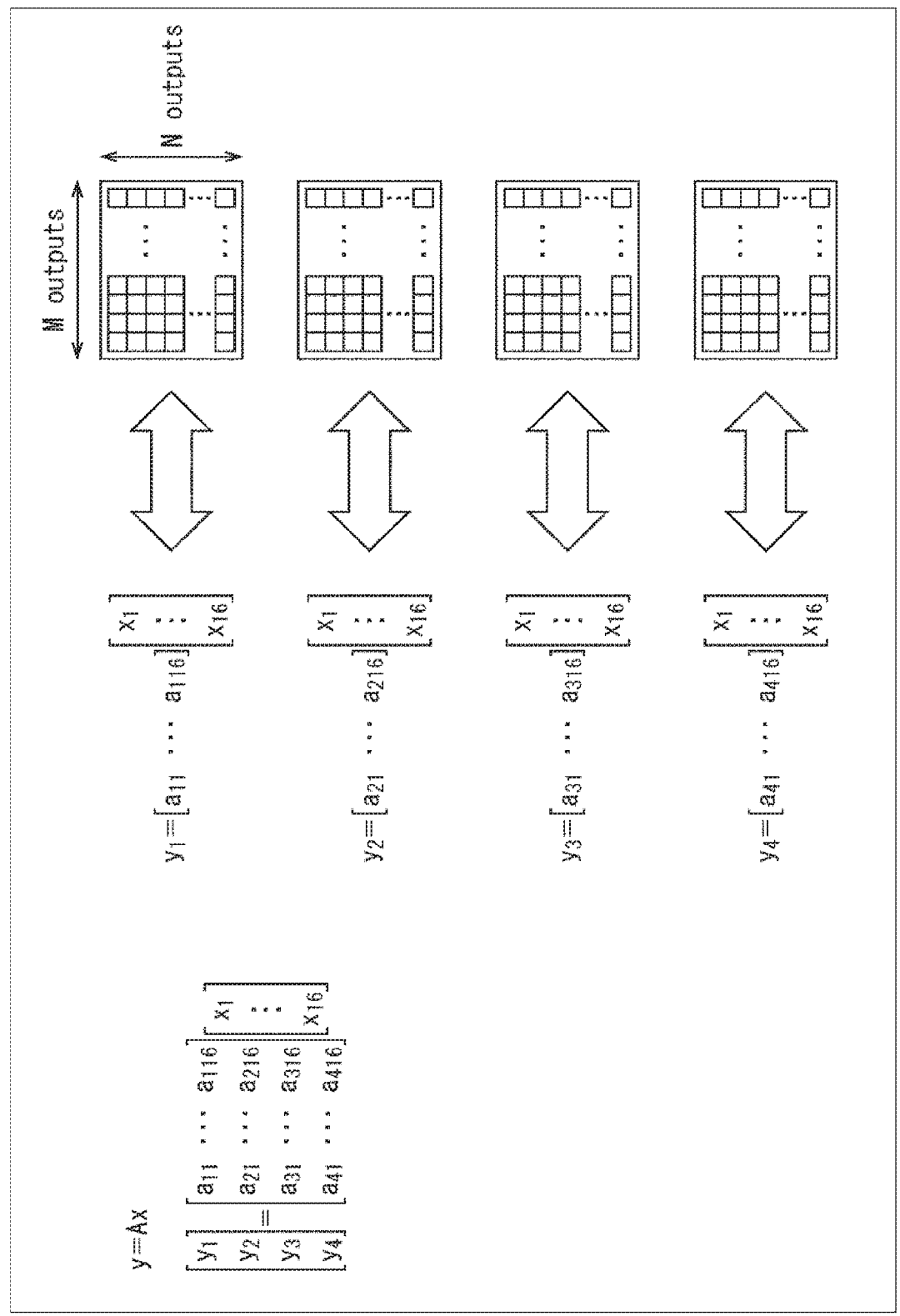
FIG. 7 is a diagram that illustrates a relation among sampling functions switched in a time series, an output value of each block, and an output data format of an image sensor.

FIG. 7 illustrates a relation among sampling functions continuously switched in a time series, an output value of each block, and an output data format of an image sensor. In the case of the drawing, four types of sampling functions $A_1=[a_{11}, a_{12}, \ldots, a_{116}]$, $A_2=[a_{21}, a_{22}, \ldots, a_{216}]$, $A_3=[a_{31}, a_{32}, \ldots, a_{316}]$, and $A_4=[a_{41}, a_{42}, \ldots, a_{416}]$ that are switched continuously in a time series are represented together as a matrix equation A of four rows×16 columns.

The output values y for the sampling functions $A_1, A_2, A_3$, and $A_4$ are $[y_1, y_2, y_3, y_1]$ each being M×N two-dimensional array data (reduced image).

<Specific Pixel Control Based on Sampling Function A>

Next, specific pixel control based on the sampling function A will be described.

In each row vector of the sampling function A, there may be at least one element of "1", and the remaining elements may be "0".

FIG. 8 is an example of the sampling function A of a case where one pixel is selected and read among 16 pixels configuring a block 41 and is configured by four types (corresponding to four rows) of row vectors that are sequentially applied in a time series. In a case where this sampling function A is applied, one pixel among 16 pixels configuring the block 41 is read and output in a time series to be in correspondence with four pixels.

FIGS. 9A, 9B, 9C and 9D illustrate the appearance of control performed by the pixel control unit 22 based on a sampling function A illustrated in FIG. 8.

Figure 9:
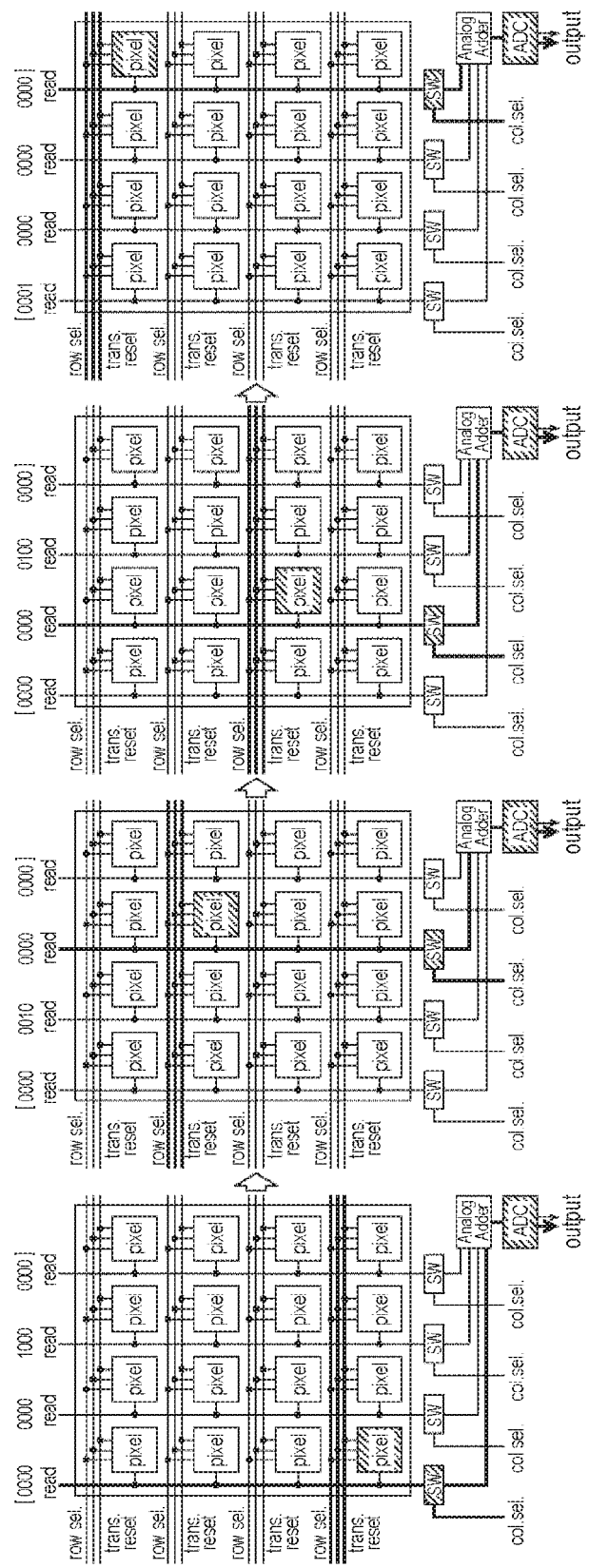
FIGS. 9A, 9B, 9C, and 9D are diagrams that illustrate the appearance of pixel control based on a sampling function illustrated in FIG. 8.

In other words, it corresponds to "0 0 0 0 0 0 0 0 0 0 0 0 1 0 0 0" of the first row of the sampling function A illustrated in FIG. 8, and, as illustrated in FIG. 9A, a row selection signal line of the fourth row and a column selection signal line of the first column in each block 41 become active, and one pixel positioned in the fourth row and the first column is selected among 4×4 pixels. In addition, a column selection switch of the first column among four column selection switches 52 and the ADC 54 are driven. Accordingly, the pixel value of one pixel positioned in the fourth row and the first column among the 4×4 pixels is output as a digital signal.

At the next timing, similar control is performed in correspondence with "0 0 0 0 0 1 0 0 0 0 0 0 0 0 0 0" of the second row of the sampling function A illustrated in FIG. 8, and, as illustrated in FIG. 9B, one pixel positioned in the second row and the third column among the 4×4 pixels of each block 41, a column selection switch of the third column among four column selection switches 52, and the ADC 54 are driven. Accordingly, the pixel value of one pixel positioned in the second row and the third column among the 4×4 pixels is output as a digital signal.

At the further next timing, similar control is performed in correspondence with "0 0 0 0 0 0 0 0 0 1 0 0 0 0 0 0" of the third row of the sampling function A illustrated in FIG. 8, and, as illustrated in FIG. 9C, one pixel positioned in the third row and the second column among the 4×4 pixels of each block 41, a column selection switch of the second column among the four column selection switches 52, and the ADC 54 are driven. Accordingly, the pixel value of one pixel positioned in the third row and the second column among the 4×4 pixels is output as a digital signal.

At the further next timing, similar control is performed in correspondence with "0 0 0 1 0 0 0 0 0 0 0 0 0 0 0 0" of the fourth row of the sampling function A illustrated in FIG. 8, and, as illustrated in FIG. 9D, one pixel positioned in the first row and the fourth column among the 4×4 pixels of each block 41, a column selection switch of the fourth column among the four column selection switches 52, and the ADC 54 are driven. Accordingly, the pixel value of one pixel positioned in the first row and the fourth column among the 4×4 pixels is output as a digital signal.

FIG. 10 is an example of the sampling function A of a case where six pixels are selected and read among 16 pixels configuring a block 41, and, in the case of the drawing, a row vector of only one type (corresponding to one row) is illustrated. In a case where this sampling function A is applied, six pixels among 16 pixels configuring the block 41 are read and added to be output.

FIGS. 11A, 11B, 11C, and 11D illustrate pixels 42 and the like driven by the pixel control unit 22 on the basis of the sampling function A illustrated in FIG. 10.

As in the case of the sampling function A illustrated in FIG. 10, in a case where two or more pixels are read from the same column, reading of pixels is performed to be divided into four phases according to the number of rows of the block 41.

Figure 11:
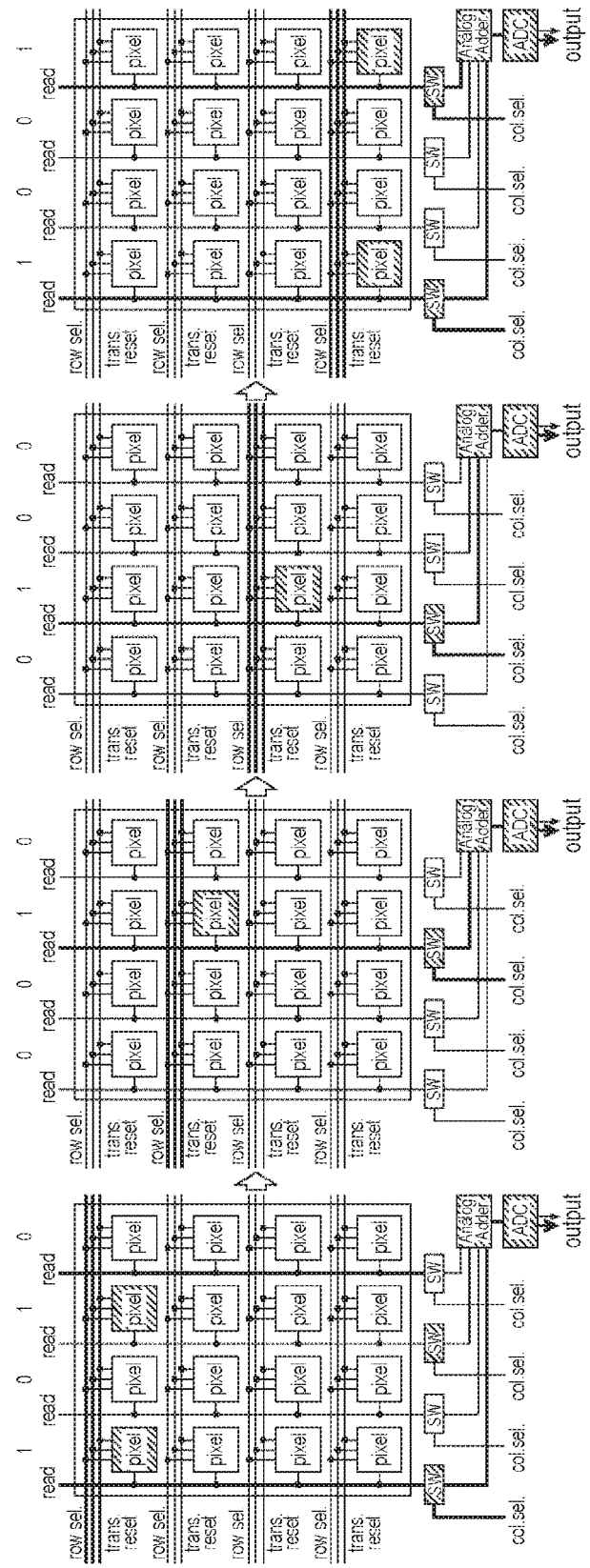
FIGS. 11A, 11B, 11C, and 11D are diagrams that illustrate the appearance of pixel control based on the sampling function illustrated in FIG. 10.

In other words, in the first phase, it corresponds to the elements "1 0 1 0" of the first column to the fourth column among the row vectors of the sampling function A illustrated in FIG. 10, and, as illustrated in FIG. 11A, a row selection signal line of the first row and column selection signal lines of the first and third columns in each block 41 become active, and two pixels positioned in the first row and the first column and the first row and the third column are selected among 4×4 pixels. In addition, column selection switches of the first and third columns among four column selection switches 52, the analog adder 53, and the ADC 54 are driven. Accordingly, the pixel values of two pixels positioned in the first row and the first column and the first row and the third column among the 4×4 pixels are converted into digital signals, and the digital values are stored in a counter arranged inside the ADC 54.

In the second phase, similar control is performed in correspondence with the elements "0 0 1 0" of the fifth column to the eighth column among the row vectors of the sampling function A illustrated in FIG. 10, and, as illustrated in FIG. 11B, one pixel positioned in the second row and the third column is selected among the 4×4 pixels. In addition, a column selection switch of the third column among four column selection switches 52, the analog adder 53, and the ADC 54 are driven. Accordingly, the pixel value of one pixel positioned in the second row and the third column among the 4×4 pixels is converted into a digital signal, and the digital value is added to and stored in a counter arranged inside the ADC 54.

In the third phase, similar control is performed in correspondence with the elements "0 1 0 0" of the ninth column to the 12th column among the row vectors of the sampling function A illustrated in FIG. 10, and, as illustrated in FIG. 11C, one pixel positioned in the third row and the second column is selected among the 4×4 pixels. In addition, the column selection switch of the second column among the four column selection switches 52, the analog adder 53, and the ADC 54 are driven. Accordingly, the pixel value of one pixel positioned in the third row and the second column among the 4×4 pixels is converted into a digital signal, and the digital value is added to and stored in the counter arranged inside the ADC 54.

Finally, in the fourth phase, similar control is performed in correspondence with the elements "1 0 0 1" of the 13th column to the 16th column among the row vectors of the sampling function A illustrated in FIG. 10, and, as illustrated in FIG. 11D, two pixels positioned in the fourth row and the first column and the fourth row and the fourth column are selected among 4×4 pixels. In addition, column selection switches of the first and third columns among four column selection switches 52, the analog adder 53, and the ADC 54 are driven. Accordingly, the pixel values of two pixels positioned in the fourth row and the first column and the fourth row and the fourth column among the 4×4 pixels are converted into digital values, and the digital values are added in the counter arranged inside the ADC 54 and are output to a later stage.

<Second Configuration Example of Image Sensor 23>

Figure 12:
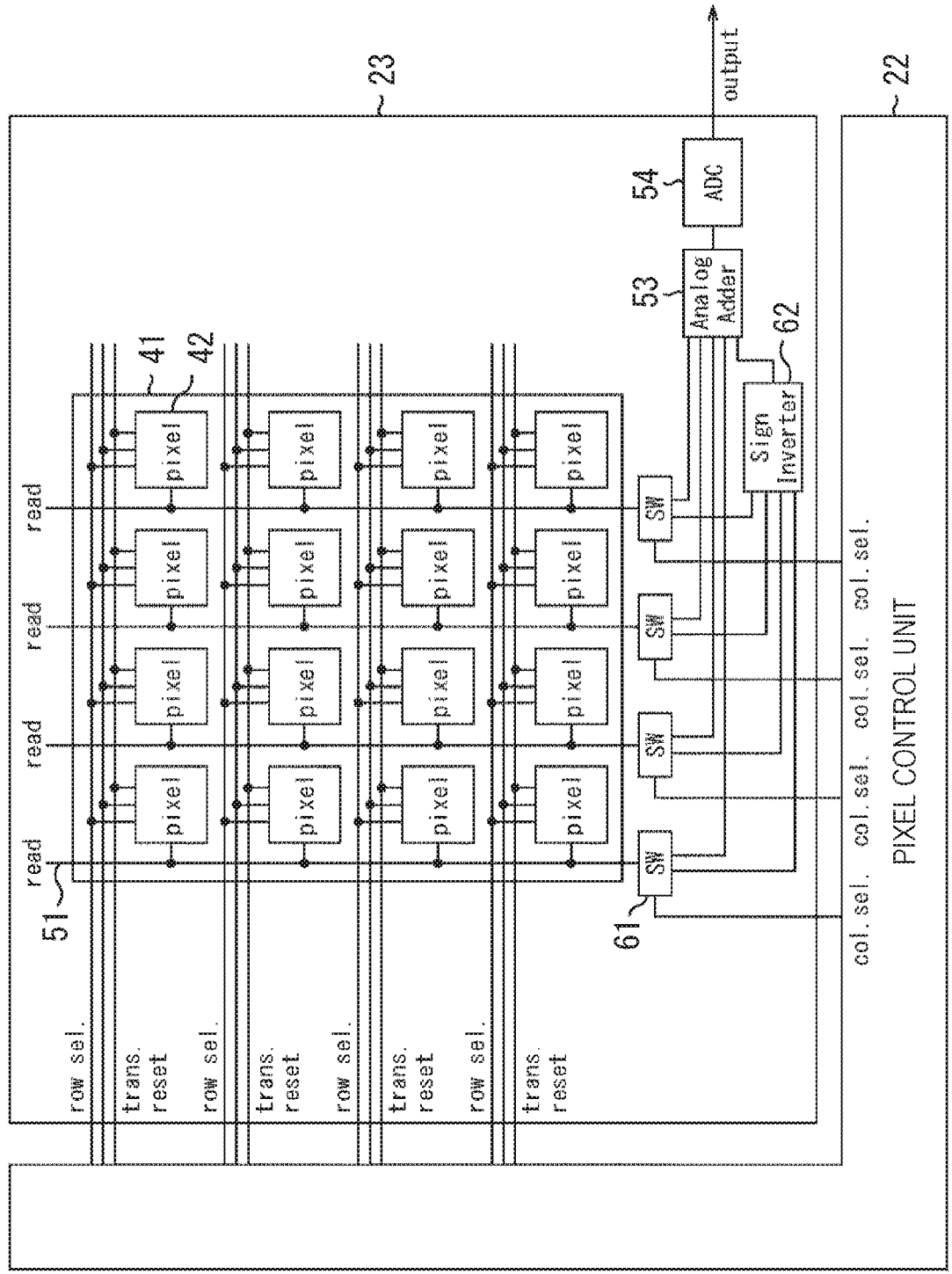
FIG. 12 is a block diagram that illustrates a second configuration example of an image sensor.

Next, FIG. 12 illustrates a second configuration example of the image sensor 23. In this second configuration example, for the first configuration example illustrated in FIG. 5, the column selection switch 52 is replaced by the column selection switch 61, and an analog sign inverter 62 is added. The same reference numeral is assigned to a configuration element common to the first configuration example, and thus the description thereof will not be presented as is appropriate.

The column selection switch 61 has an output side connected to the analog adder 53 and the analog sign inverter 62 and outputs a pixel signal read from the pixel 42 to the analog adder 53 or the analog sign inverter 62 in accordance with the control from the pixel control unit 22 through a column selection signal. The analog sign inverter 62 has an output side connected to the analog adder 53 and adds a negative sign to an input pixel signal and outputs a resultant signal to the analog adder 53.

According to the second configuration example of the image sensor 23 to which the analog sign inverter 62 is added, the pixel signals of pixels corresponding to the sampling function A among 16 pixels configuring the block 41 are read, and addition or subtraction of the pixel signals is performed, and then a resultant signal can be output as a digital signal.

FIG. 13 illustrates an example of the sampling function A that can be applied to the second configuration example of the image sensor 23. Among the elements of the row vector of the sampling function A illustrated in the drawing, a pixel value is read and added for a pixel corresponding to "1", a pixel value is read and subtracted for a pixel corresponding to "−1", and a pixel value is not read for a pixel corresponding to "0" (not driven).

FIGS. 14A, 14B, 14C, and 14D illustrate pixels 42 and the like driven by the pixel control unit 22 on the basis of the sampling function A illustrated in FIG. 13.

As in the case of the sampling function A illustrated in FIG. 13, in a case where two or more pixels are read from the same column, reading of pixels is performed to be divided into four phases according to the number of rows of the block 41.

Figures 14A, 14B, 14C, 14D:
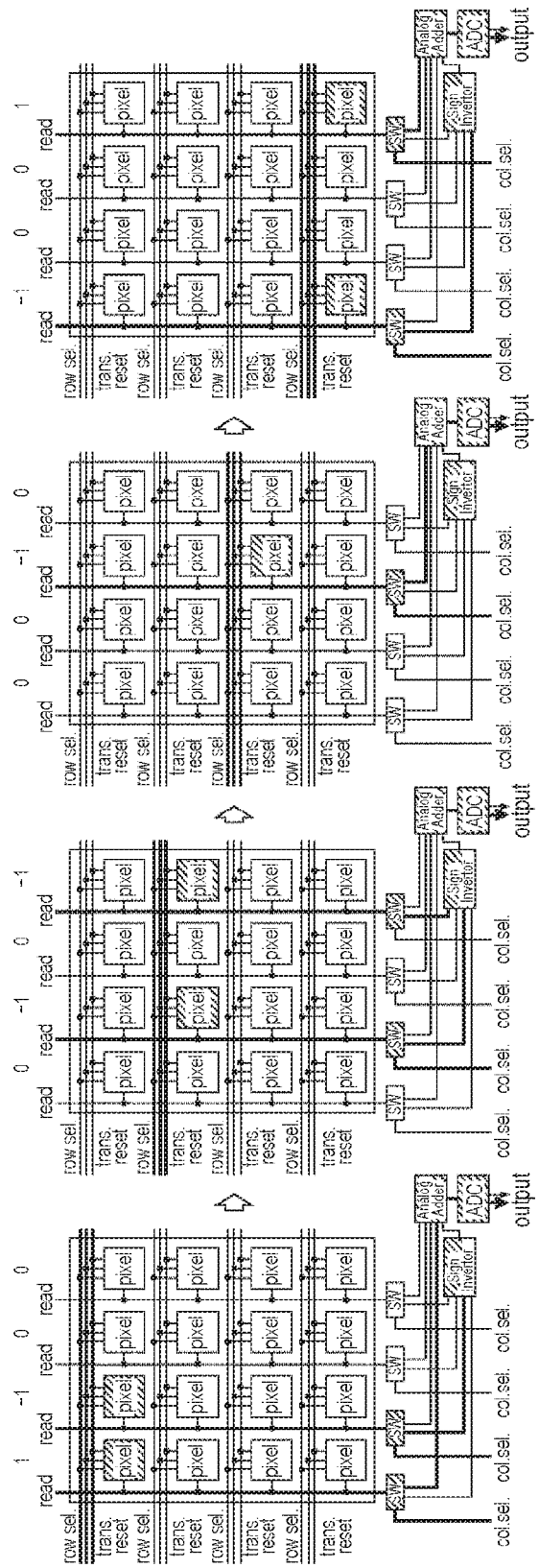
FIGS. 14A, 14B, 14C, and 14D are diagrams that illustrate the appearance of pixel control based on the sampling function illustrated in FIG. 13.

In other words, in the first phase, it corresponds to elements "1 −1 0 0" of the first to fourth columns among the row vectors of the sampling function A illustrated in FIG. 13, and, as illustrated in FIG. 14A, a row selection signal line of the first row and column selection signal lines of the first and second columns of each block 41 become active, and two pixels positioned in the first row and the first column and the first row and the second column among 4×4 pixels are selected. In addition, the output destination of the column selection switch 61 of the first column is the analog adder 53, and the output destination of the column selection switch 61 of the second column is the analog sign inverter 62. Furthermore, the analog adder 53, the analog sign inverter 62, and the ADC 54 are driven. Accordingly, after a pixel value acquired by negatively inverting the sign of the pixel positioned in the first row and the third column is added to the pixel value of the pixel positioned in the first row and the first column among the 4×4 pixels, a resultant value is converted into a digital signal and is stored in the counter disposed inside the ADC 54.

Next, in the second phase, similar control is performed in correspondence with elements "0-1 0-1" of the fifth to eighth columns among row vectors of the sampling function A illustrated in FIG. 13, and, as illustrated in FIG. 14B, two pixels positioned in the second row and the second column and the second row and the fourth column are selected among the 4×4 pixels. In addition, the output destinations of the column selection switches 61 of the second and fourth columns are the analog sign inverter 62. Furthermore, the analog adder 53, the analog sign inverter 62, and the ADC 54 are driven. Accordingly, after a pixel value acquired by negatively inverting the sign of the pixel positioned in the second row and the fourth column is added to the pixel value acquired by negatively inverting the sign of the pixel positioned in the second row and the first column among the 4×4 pixels, a resultant value is converted into a digital signal and is added to and stored in the counter disposed inside the ADC 54.

Next, in the third phase, similar control is performed in correspondence with elements "0 0 1 0" of the ninth to 12th columns among row vectors of the sampling function A illustrated in FIG. 13, and, as illustrated in FIG. 14C, one pixel positioned in the third row and the third column is selected among the 4×4 pixels. In addition, the output destination of the column selection switch 61 of the third column is the analog adder 53. Furthermore, the analog adder 53, the analog sign inverter 62, and the ADC 54 are driven. Accordingly, the pixel value of the pixel positioned in the third row and the third column among the 4×4 pixels is converted into a digital signal and is added to and stored in the counter disposed inside the ADC 54.

Finally, in the fourth phase, similar control is performed in correspondence with elements "−1 0 0 1" of the 13th to 16th columns among row vectors of the sampling function A illustrated in FIG. 13, and, as illustrated in FIG. 14D, two pixels positioned in the fourth row and the first column and the fourth row and the fourth column are selected among the 4×4 pixels. In addition, the output destination of the column selection switch 61 of the first column is the analog sign inverter 62, and the output destination of the column selection switch 61 of the fourth column is the analog adder 53. Furthermore, the analog adder 53, the analog sign inverter 62, and the ADC 54 are driven. Accordingly, the pixel value of the pixel positioned in the fourth row and the fourth column is added to a pixel value acquired by negatively inverting the sign of the pixel positioned in the fourth row and the first column among 4×4 pixels, a resultant value is converted into a digital signal and is added to the counter disposed inside the ADC 54, and a resultant value is output to a later stage.

<Description of Operation of Imaging Apparatus 20 According to First Configuration Example Illustrated in FIG. 2>

Figure 15:
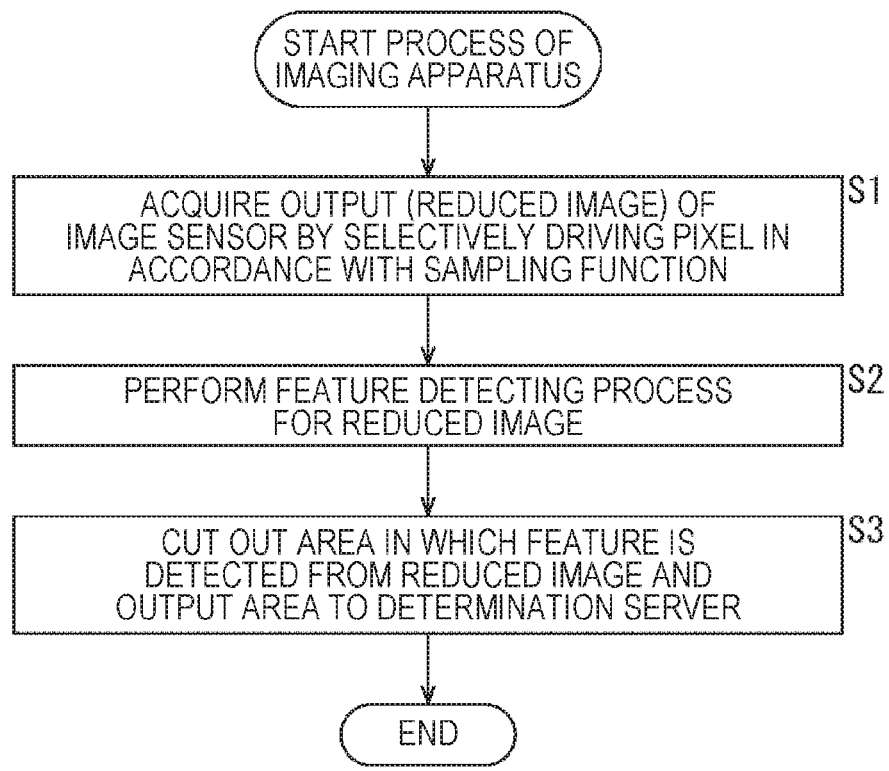
FIG. 15 is a flowchart that describes the process of an imaging apparatus in the first configuration example illustrated in FIG. 2.

Next, FIG. 15 is a flowchart that describes the operation of the imaging apparatus 20 according to the first configuration example illustrated in FIG. 2.

In Step S1, the pixel control unit 22 acquires a sampling function determined on the determination server 30 side in advance from the sampling function storing unit 21 and drives the image sensor 23 in accordance with the acquired sampling function. Accordingly, a reduced pixel (CS data for every M×N blocks) is output from the image sensor 23 and is stored in the image sensor output storing unit 24.

In Step S2, the feature detecting unit 25 performs a feature detecting process of, for example, detecting areas in which features of a person, a face, and the like are present for a reduced image that is stored in the image sensor output storing unit 24 as a target and notifies the area cutting-out unit 26 of the areas in which a person, a face, or the like is detected.

In Step S3, the area cutting-out unit 26 cuts out only areas in which a person, a face, or the like is detected from the reduced image stored in the image sensor output storing unit 24 in accordance with a notification from the feature detecting unit 25 and transmits the cut-out areas to the determination server 30 through the network 11. As above, the operation of the imaging apparatus 20 in the first configuration example corresponding to one frame ends.

As described above, in the imaging apparatus 20 in the first configuration example, CS reading according to the sampling function is performed, and accordingly, the power consumption can be suppressed. In addition, in the reduced image acquired by the CS reading, only areas in which features are detected are transmitted to the determination server 30. Accordingly, compared to a case where the whole image acquired through ordinary imaging using the image sensor 23 is directly transmitted to the determination server 30, the amount of data communication can be significantly decreased.

Furthermore, while an image reconfiguring process is necessary on the determination server 30 side, the identification determining process can be performed without performing the feature detecting process again, and accordingly, the processing load of the determination server 30 side can be decreased.

<Second Configuration Example of Imaging Apparatus 20 and Determination Server 30>

Figure 16:
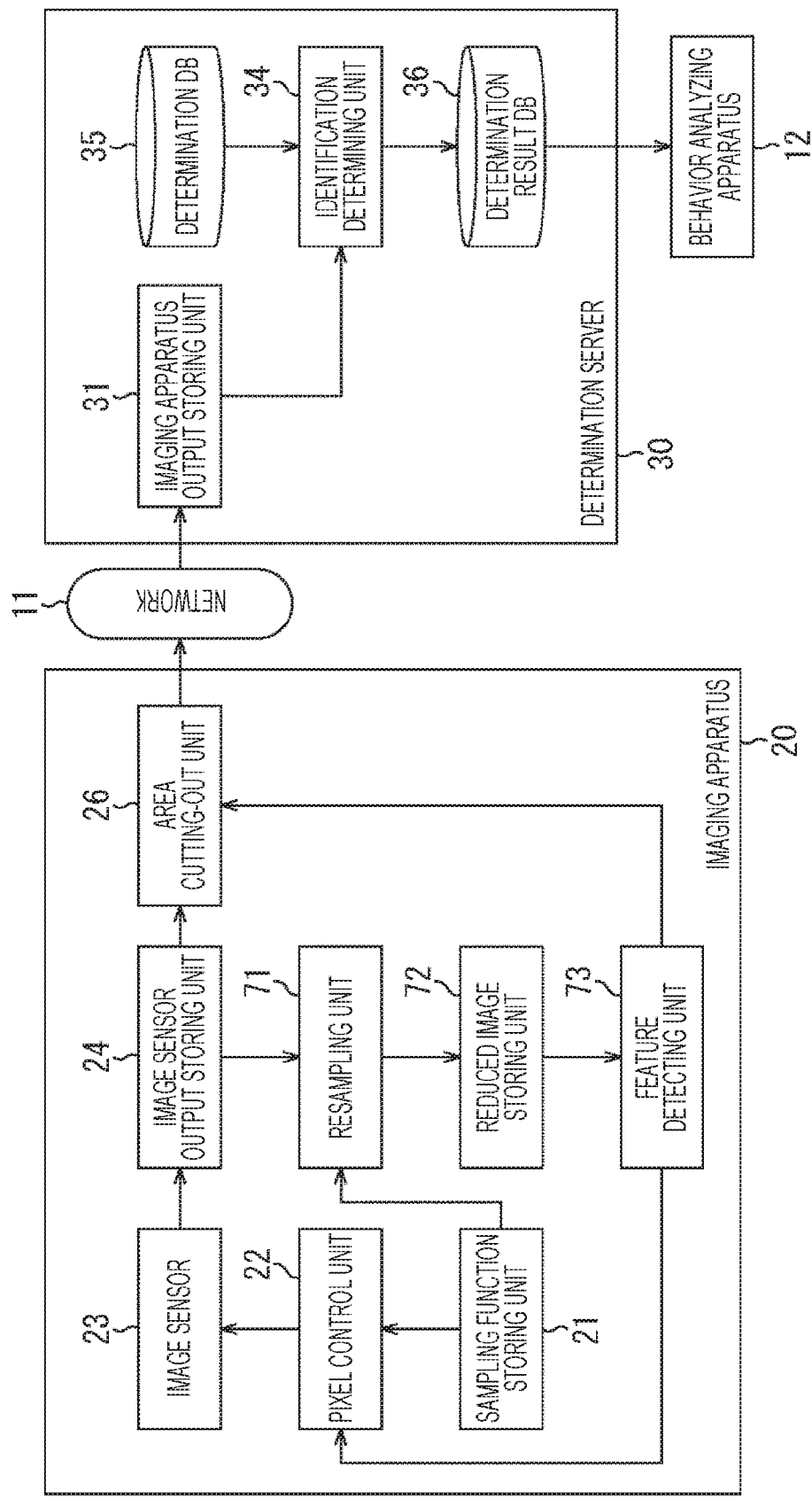
FIG. 16 is a block diagram that illustrates a second configuration example of an imaging apparatus and a determination server.

Next, FIG. 16 illustrates a second configuration example of the imaging apparatus 20 and the determination server 30. Note that the same reference numeral is assigned to a configuration element common to the first configuration example illustrated in FIG. 2 in the constituent elements of this second configuration example, and thus the description thereof will not be presented as is appropriate.

The imaging apparatus 20 according to the first configuration example illustrated in FIG. 2 performs CS reading by applying a common sampling function for all the blocks of the image sensor 23 and acquires a reduced image.

In contrast to this, the imaging apparatus 20 according to the second configuration example does not necessarily need to apply a common sampling function for all the blocks and can apply a sampling function different from the common sampling function for a specific block.

For example, on the behavior analyzing side, in a case where a fine expression of a detected person is to be analyzed, only in the face area of a person, there are cases where not CS data but image data including the pixel values of all the pixels is necessary. According to such a case, the imaging apparatus 20 according to the second configuration example, can apply a sampling function representing reading of all the pixels for blocks of areas in which features (a face and the like) are detected.

The imaging apparatus 20 according to the second configuration example is configured by a sampling function storing unit 21, a pixel control unit 22, an image sensor 23, an image sensor output storing unit 24, a resampling unit 71, a reduced image storing unit 72, a feature detecting unit 73, and an area cutting-out unit 26.

The sampling function storing unit 21 stores a plurality of different sampling functions and supplies a stored sampling function in response to a request from the pixel control unit 22 or the resampling unit 71.

Note that a sampling function that is commonly applied to each block of the image sensor 23 and a sampling function (for example, reading of all the pixels within the block) applied to specific blocks are supplied to the pixel control unit 22. On the other hand, a sampling function that is commonly applied to each block of the image sensor 23 is supplied to the resampling unit 71.

The pixel control unit 22 controls the driving (exposing and reading each pixel) of the image sensor 23. More specifically, the pixel control unit 22 drives only pixels corresponding to a common sampling function in each block of the image sensor 23, thereby controlling the CS reading of the image sensor 23. In addition, in the case of the second configuration example, the pixel control unit 22 can apply a sampling function other than the sampling function that is commonly applied to the other blocks to specific blocks. More specifically, for example, a sampling function for reading all the pixels may be applied to blocks disposed on the periphery of areas, in which features are detected, notified from the feature detecting unit 73.

By driving pixels and the like in accordance with the control from the pixel control unit 22, the image sensor 23 outputs CS data for each block to the image sensor output storing unit 24.

The image sensor output storing unit 24 stores the CS data for each block that is input from the image sensor 23. However, in the case of the second configuration example, since there are cases where a common sampling function is not applied, the CS data of each block stored in the image sensor output storing unit 24 cannot be regarded as a reduced image.

The resampling unit 71 acquires the CS data of each block stored in the image sensor output storing unit 24, performs a resampling process of applying a common sampling function to the CS data of each block acquired from the sampling function storing unit 21, and stores a result of the process in the reduced image storing unit 72.

Here, since a common sampling function is applied, the result of the resampling process stored in the reduced image storing unit 72 can be regarded as a reduced image. In addition, among the CS data of each block stored in the image sensor output storing unit 24, for CS data to which a common sampling function is applied, the resampling process may be omitted.

The feature detecting unit 73, by performing a feature detecting process similar to that of the feature detecting unit 25 illustrated in FIG. 2, for example, detects areas having features such as a person or a face for a reduced image stored in the reduced image storing unit 72 as a target and notifies the areas in which a person, a face, or the like is detected to the area cutting-out unit 26 and the pixel control unit 22.

The area cutting-out unit 26 cuts out CS data of each block stored in the image sensor output storing unit 24 that corresponds to the areas in which a person, a face, and the like are detected in accordance with the notification from the feature detecting unit 25 and transmits the cut-out areas to the determination server 30 through the network 11.

However, for the CS data for each block stored in the image sensor output storing unit 24, the CS data of specific blocks (blocks of the periphery of the areas in which features are detected in the previous feature detecting process) is the pixel values of all the pixels belonging to the block. Accordingly, the pixel values of all the pixels of the blocks belonging to the areas in which a feature is detected are transmitted to the determination server 30.

Accordingly, the image reconfiguring process in the determination server 30 according to the second configuration example is unnecessary, and accordingly, the determination server 30 according to the second configuration example may take a configuration acquired by omitting the image reconfiguring unit 32 and the sampling function storing unit 33 from the determination server 30 according to the first configuration example illustrated in FIG. 2. The other constituent elements of the determination server 30 according to the second configuration example are similar to those of the first configuration example, and thus, the description thereof will not be presented.

<Example of Sampling Function Directing all-Pixel Reading>

FIG. 17 illustrates an example of a sampling function, which is different from the sampling function that is commonly applied to the other blocks, applied to specific blocks by the pixel control unit 22.

In this sampling function A of 16 rows and 16 columns, only one element of each row vector has a value of "1", and the other 15 elements have a value of "0". By sequentially applying these 16 types of row vectors (a sampling function of one row×16 columns), all the pixels can be read from blocks to which this sampling function is applied.

FIGS. 18A, 18B, 18C, and 18D illustrate the appearance of control, which is performed by the pixel control unit 22, based on the sampling function A illustrated in FIG. 17.

Figure 18:
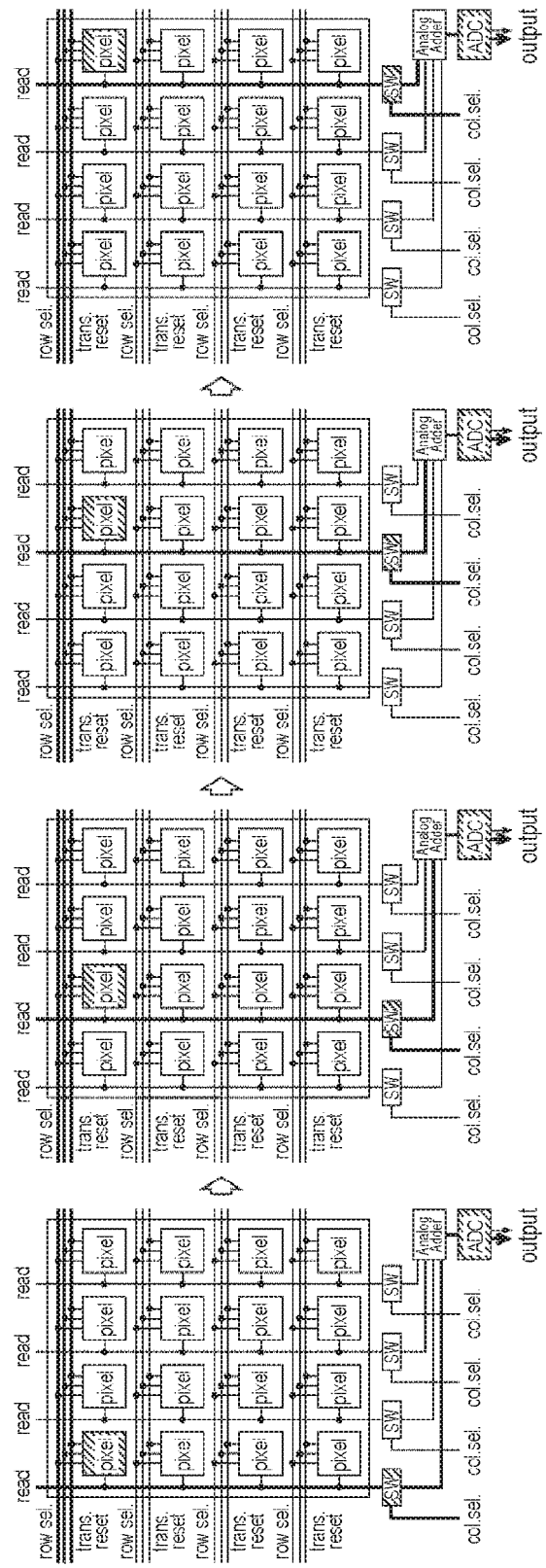
FIGS. 18A, 18B, 18C, and 18D are diagrams that illustrate the appearance of pixel control based on the sampling function illustrated in FIG. 17.

In other words, it corresponds to "1 0 0 0 0 0 0 0 0 0 0 0 0 0 0 0" of the first row of the sampling function A illustrated in FIG. 17, and, as illustrated in FIG. 18A, the row selection signal line of the first row and the column selection signal line of the first column of a corresponding block 41 become active, and one pixel positioned in the first row and the first column is selected among 4×4 pixels. In addition, a column selection switch of the first column among four column selection switches 52 and the ADC 54 are driven. Accordingly, the pixel value of one pixel positioned in the first row and the first column among the 4×4 pixels is output as a digital signal.

At the next timing, similar control is performed in correspondence with "0 1 0 0 0 0 0 0 0 0 0 0 0 0 0 0" of the second row of the sampling function A illustrated in FIG. 17, and, as illustrated in FIG. 18B, one pixel positioned in the first row and the second column among the 4×4 pixels of a corresponding block 41, a column selection switch of the second column among four column selection switches 52, and the ADC 54 are driven. Accordingly, the pixel value of one pixel positioned in the first row and the second column among the 4×4 pixels is output as a digital signal.

At the further next timing, similar control is performed in correspondence with "0 0 1 0 0 0 0 0 0 0 0 0 0 0 0 0" of the third row of the sampling function A illustrated in FIG. 17, and, as illustrated in FIG. 18C, one pixel positioned in the first row and the third column among the 4×4 pixels of a corresponding block 41, a column selection switch of the third column among the four column selection switches 52, and the ADC 54 are driven. Accordingly, the pixel value of one pixel positioned in the first row and the third column among the 4×4 pixels is output as a digital signal.

At the next timing, similar control is performed in correspondence with "0 0 0 1 0 0 0 0 0 0 0 0 0 0 0 0" of the fourth row of the sampling function A illustrated in FIG. 17, and, as illustrated in FIG. 18D, one pixel positioned in the first row and the fourth column among the 4×4 pixels of a corresponding block 41, a column selection switch of the fourth column among the four column selection switches 52, and the ADC 54 are driven. Accordingly, the pixel value of one pixel positioned in the first row and the fourth column among the 4×4 pixels is output as a digital signal.

For the subsequent timings, although the description and the illustration are omitted, the pixel value of one pixel among the 4×4 pixels of the corresponding block 41 is similarly output as a digital signal.

However, in a block driven according to the sampling function A applied to specific blocks as illustrated in FIG. 17 and a block driven according to the sampling function A that is commonly applied to blocks other than the specific blocks as illustrated in FIG. 8, the number of pixels to be read is different, and the number of times of selecting each row within the block is different, and accordingly, the control cannot be synchronized between the blocks. For example, in a block of all-pixel reading, the ADC needs to be driven at several times higher speed (four times for the ratio of the example illustrated in FIGS. 18A, 18B, 18C, and 18D).

However, while the row selection signal line and the column selection signal line are shared between blocks, the ADC is disposed for each block. By using this, timing at which the selection control signal is given is delayed in units of rows of the block without synchronizing all the blocks, and thus a control signal used for all-pixel reading of only specific blocks can be output. In addition, by driving the ADC of the block at a high speed in accordance therewith, blocks driven according to mutually-different sampling functions can be mixed. In addition, also by delaying the timing at which the selection control signal is given in units of blocks, blocks driven according to mutually-different sampling functions can be mixed.

<Description of Operation of Imaging Apparatus 20 According to Second Configuration Example Illustrated in FIG. 16>

Figure 19:
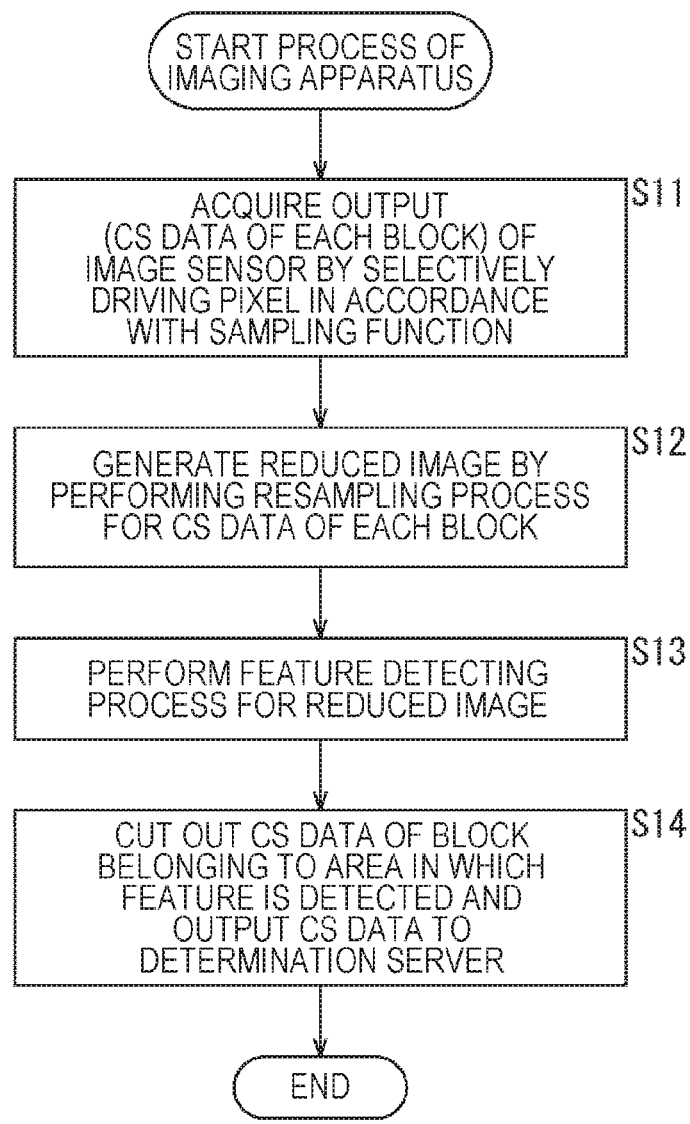
FIG. 19 is a flowchart that describes the process of an imaging apparatus in the second configuration example illustrated in FIG. 16.

Next, FIG. 19 is a flowchart that describes the operation of the imaging apparatus 20 according to the second configuration example illustrated in FIG. 16.

Here, as a premise, it is assumed that areas in which features are detected according to the previous feature detecting process are notified from the feature detecting unit 73 to the pixel control unit 22 in advance.

In Step S11, the pixel control unit 22 acquires a sampling function applied to specific blocks and a sampling function applied to be common to blocks other than the specific blocks from the sampling function storing unit 21 and drives the image sensor 23 in accordance with the acquired sampling functions. Accordingly, CS data of each block is output from the image sensor 23 and is stored in the image sensor output storing unit 24.

In Step S12, the resampling unit 71 acquires CS data of each block stored in the image sensor output storing unit 24 and acquires a sampling function to be applied to be common to each block of the image sensor 23 from the sampling function storing unit 21. In addition, the resampling unit 71 applies a common sampling function to the acquired CS data of each block to generate a reduced image and stores the generated reduced image in the reduced image storing unit 72.

In Step S13, the feature detecting unit 73 performs a feature detecting process of, for example, detecting areas in which features of a person, a face, and the like are present for a reduced image that is stored in the reduced image storing unit 72 as a target and notifies the area cutting-out unit 26 and the pixel control unit 22 of the areas in which a person, a face, or the like is detected.

In Step S14, the area cutting-out unit 26 cuts out only CS data corresponding to areas in which a person, a face, or the like is detected from the CS data of each block stored in the image sensor output storing unit 24 in accordance with the notification from the feature detecting unit 73 and transmits the cut-out CS data to the determination server 30 through the network 11. Here, in the CS data of each block stored in the image sensor output storing unit 24, the CS data of specific blocks (blocks disposed on the periphery of the areas in which features are detected in the previous feature detecting process) are the pixel values of all the pixels belonging to the block. Accordingly, the pixel values of all the pixels of blocks belonging to the areas in which features are detected are transmitted to the determination server 30. As above, the operation of the imaging apparatus 20 according to the second configuration example that corresponds to one frame ends.

As described above, in the imaging apparatus 20 according to the second configuration example, CS reading according to the sampling function is performed, and accordingly, the power consumption can be suppressed. In addition, for the areas in which features are detected, the pixel values of all the pixels are transmitted to the determination server 30, and accordingly, compared to a case where the whole image acquired through ordinary imaging of the image sensor 23 is directly transmitted to the determination server 30, the amount of data communication can be decreased significantly.

Furthermore, on the determination server 30 side, the identification detecting process can be performed using the pixel values of all the pixels of areas in which features are detected without performing the feature detecting process again, and accordingly, in addition to a decrease in the processing load of the determination server 30 side, a more detailed image analysis or a more detailed behavior analysis can be performed.

<Second Configuration Example of Pixel 42>

Figure 20:
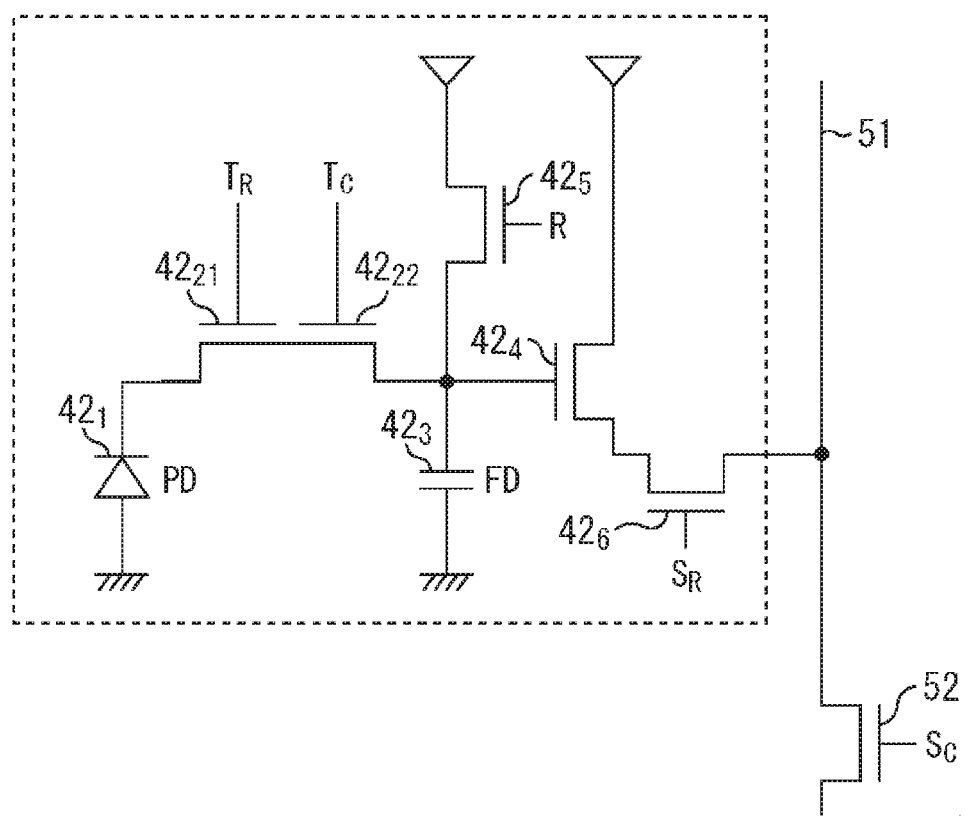
FIG. 20 is an equivalent circuit diagram that corresponds to a second configuration example of pixels.

FIG. 20 illustrates an equivalent circuit corresponding to a second configuration example of a pixel 42 arranged on the imaging surface 40 of the image sensor 23.

In the second configuration example of the pixel 42, the transfer switch $42_2$ of the first configuration example illustrated in FIG. 4 is replaced by multi-bit transfer switches $42_{21}$ and $42_{22}$, and the other constituent elements are common to those of the first configuration example, and the same reference sign is assigned thereto.

In the first configuration example illustrated in FIG. 4, when a selected pixel is read on the basis of the sampling function, pixels that are not selected are reset, and electric charged accumulated therein cannot be read.

In the second configuration example, only in a case where a row transfer signal $T_R$ and a column transfer signal $T_C$ are simultaneously applied to the transfer switches $42_{21}$ and $42_{22}$, the electric charge accumulated in the PD $42_1$ is transmitted to the FD $42_3$. In this way, without resetting the pixels that are not selected on the basis of the sampling function, the accumulated electric charge can be read in a case where the pixel is selected on the basis of the sampling function that is applied thereafter.

Figure 21A:
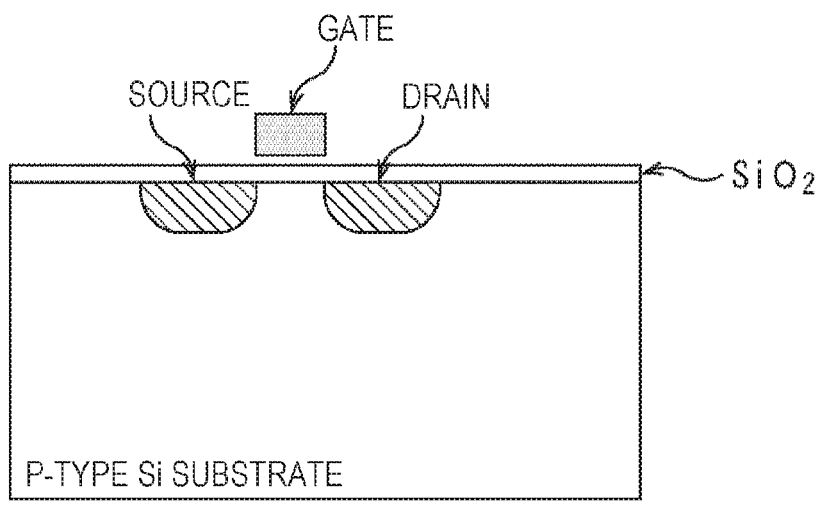
FIGS. 21A and 21B are cross-sectional views that illustrate the structure of a MOSFET of a pixel.
Figure 21B:
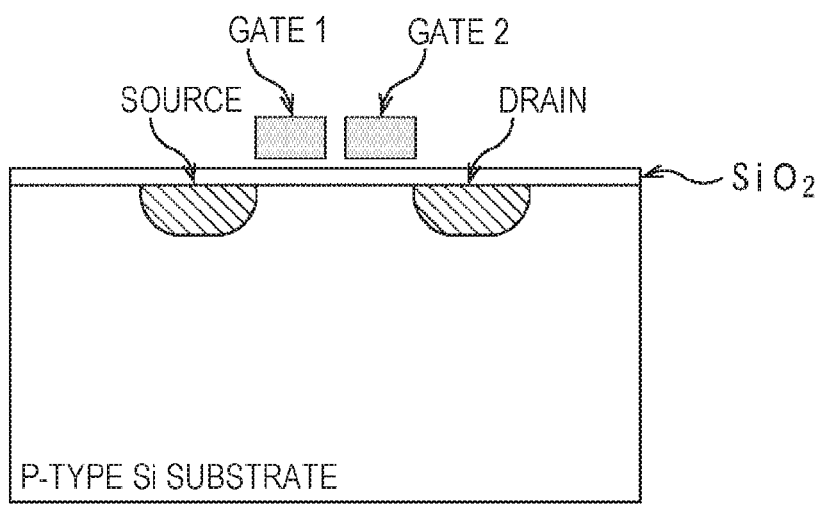

FIGS. 21A and 21B illustrate a cross-sectional view that illustrates the structure of a MOSFET of the pixel 42. In addition, A of the drawing corresponds to the first configuration example of the pixel 42 illustrated in FIGS. 4, and B of the drawing corresponds to the second configuration example of the pixel 42 illustrated in FIG. 20.

To be common to FIG. 21A and FIG. 21B, the MOSFET is formed by arranging a semiconductor having the same property (in the case of the drawing, the N type) in a source and a drain and arranging a semiconductor having an opposite characteristic (in the case of the drawing, the P type) in a channel region positioned right below a gate.

By disposing metal electrodes on each region, the source has a function of an inlet of a current, the drain has a function of an outlet, and the gate has a function of a gate controlling the flow of a current. In a case where a voltage is not applied to the gate, a structure in which a semiconductor having a different characteristic is interposed between the source and the drain is formed, and the source and the drain are electrically insulated from each other. To the contrary, in a case where a voltage is applied to the gate, free electrons are drawn into the channel region disposed right below the gate. For this reason, a state is formed in which free electrons are rich in all the paths connecting the source and the drain, and a current can easily flow.

In B of the drawing, gates 1 and 2 correspond to the transfer switches $42_{21}$ and $42_{22}$ in the second configuration example. In the second configuration example, only in a case where voltages are simultaneously applied to the transfer switches $42_{21}$ and $42_{22}$, the current can easily flow.

<Configuration Example of Image Sensor Corresponding to Second Configuration Example of Pixel 42>

FIG. 22 illustrates a configuration example (third configuration example) of an image sensor corresponding to the second configuration example of the pixel 42.

In the third configuration example, the transfer signal line (trans.) in the first configuration example illustrated in FIG. 5 is replaced by a row transfer signal line (row trans.) and a column transfer signal line (col.trans.) connected to the multi-bit transfer switches $42_{21}$ and $42_{22}$ of each pixel 42, and the same reference numeral is assigned to each of the other common constituent elements.

In the third configuration example of the image sensor 23, by not applying a column transfer signal of columns that are not selected, the accumulated electric charge of the pixels 42 that are not selected can be stored in the PD $42_1$. Then, the electric charge stored in the PD $42_1$, at the next timing of reading of the same row, can be transmitted to the FD $42_3$ so as to be read.

In addition, in the third configuration example of the image sensor 23, in a case where the same transfer signal is constantly output from the row transfer signal line and the column signal transfer line, the same operation as that of the first configuration example illustrated in FIG. 5 can be performed.

As described above, according to the second configuration example of the pixel 42 and the third configuration example of the image sensor 23 corresponding thereto, each pixel 42 of the image sensor 23 can transmit the accumulated electric charge of the PD $42_1$ at arbitrary timing without being limited to the reset timing of the FD $42_3$. By using this, the pixel signal of each pixel can be sampled at an arbitrary exposure time. In other words, the pixel signal of each pixel can be randomly added in terms of time and space.

Here, for a comparison, FIGS. 23A and 23B illustrate an example of a sampling function, which can be applied to the first configuration example of the pixel 42 and the first configuration example of the image sensor 23 corresponding thereto, of a case where the pixel signal of each pixel is randomly sampled in time and space.

In description presented below, as illustrated in A of the drawing, one block is assumed to be partitioned into 3×3 pixels. B of the drawing illustrates a sampling function as a timing diagram, the row represents the sampling timing of each pixel, and sampling is performed at each colored square. The column represents the sampling timing. In the case of B of the drawing, data corresponding to one frame (solid-line partition) is sampled five times (broken-line partition), and a total of 15 times of sampling corresponding to three frames is performed. Note that a slight deviation of the column in units of three rows represents that reading of each row of a pixel signal from the pixel 42 is slightly deviated in time by using focal-plane reading. However, since the time difference is less than 1 H, reading of nine pixels configuring one block can be regarded to be performed at the same time.

As described above, in the first configuration example of the pixel 42, for each sampling timing, the accumulated electric charge of the PD $42_1$ is reset regardless of whether or not each of all the pixels 42 is selected (read). For this reason, for example, even in a case where a plurality of times of sampling is continuously performed as pixels $P_{11}$ and $P_{22}$ in the first frame, at each time, it is necessary to reset and perform sampling. Accordingly, it is necessary to perform three times of sampling for the pixel $P_{11}$ of the first frame and five times of sampling for the pixel $P_{22}$.

FIG. 24 illustrates a sampling function of a matrix notation corresponding to the timing diagram illustrated in FIG. 23B. As illustrated in the drawing, since a total of 15 times of sampling is performed for three frames, the sampling function is denoted altogether as a matrix of 15 rows and 9 columns representing 15 row vectors each including nine elements.

Next, FIG. 25 illustrates an example of a sampling function, which can be applied to the second configuration example of the pixel 42 and the third configuration example of the image sensor 23 corresponding thereto, of a case where pixel signals of pixels are randomly added in time and space.

In the case illustrated in FIG. 25, similar to FIGS. 23A and 23B, while data corresponding to one frame (solid-line partition) can be sampled five times (broken-line partition), and a maximum of a total of 15 times can be sampled for three frames, sampling can be continuously performed without resetting, and accordingly, any pixel may be sampled once within the frame.

In other words, in the second configuration of the pixel 42, it can be controlled whether or not the accumulated electric charge of the PD $42_1$ is transmitted regardless whether the pixel 42 is selected for reading, and accordingly, the accumulated electric charge of continuous periods does not need to be transmitted at each period but may be transmitted altogether at the end of the periods for reading.

FIG. 26 illustrates a sampling function of a matrix notation corresponding to the timing diagram illustrated in FIG. 25. In the drawing, a coefficient other than "1", for example, "3" positioned in the fourth row and the first column represents that, in a case where the sampling interval is "1", a signal of an exposure period that is continuous for three times of the exposure period is sampled.

<Third Configuration Example of Pixel 42>

Figure 27:
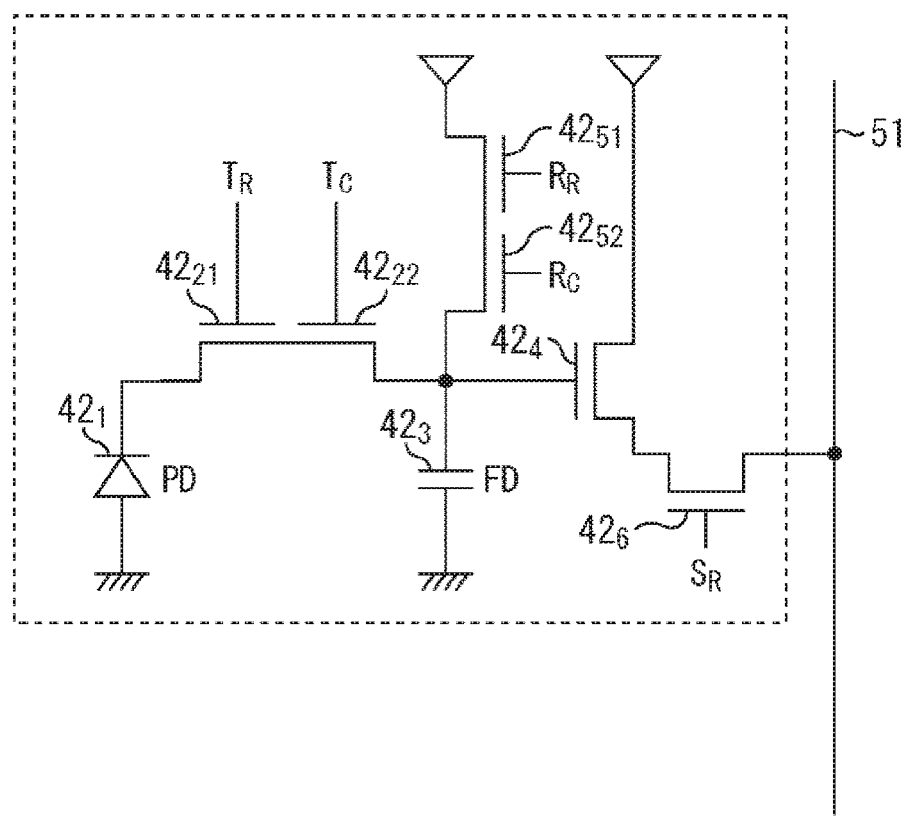
FIG. 27 is an equivalent circuit diagram that corresponds to a third configuration example of a pixel.

Next, FIG. 27 illustrates an equivalent circuit diagram that corresponds to a third configuration example of the pixel 42 arranged on the imaging surface 40 of the image sensor 23.

In the third configuration example of the pixel 42, the reset switch $42_5$ of the second configuration example illustrated in FIG. 20 is replaced by multi-bit reset switches $42_{51}$ and $42_{52}$, and the other constituent elements are common to those of the second configuration example, and the same reference sign is assigned thereto.

Figure 28:
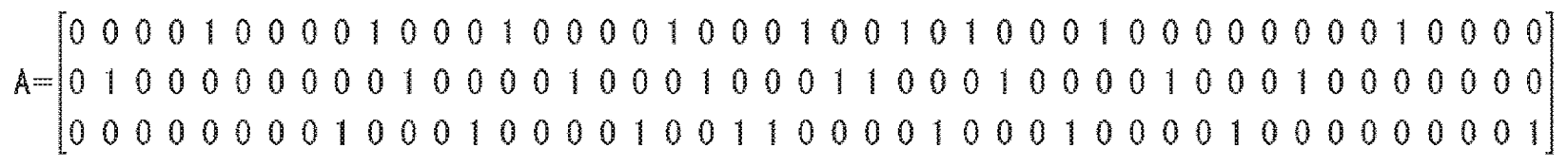

In the third configuration example, it can be controlled whether or not the FD $42_3$ is reset for each pixel regardless whether the pixel is selected as a target for signal reading. By using this, for example, in the sampling function illustrated as the timing diagram in FIG. 25, if all-pixel reset is applied only at the time of end of the exposure period of each frame, a signal acquired by adding pixels within a block exposed in different periods within the frame in a space can be read. In this case, the matrix notation of the sampling function is as illustrated in FIG. 28.

In addition, in this case, since reading is performed with pixels within the block added for each frame, the output value per frame is one value, and a row vector of the sampling function corresponding to the output value is a vector having 45 (9 pixels×5 period) elements that is a total number of sampling units within the frame.

<Fourth Configuration Example of Pixel 42>

Figure 29:
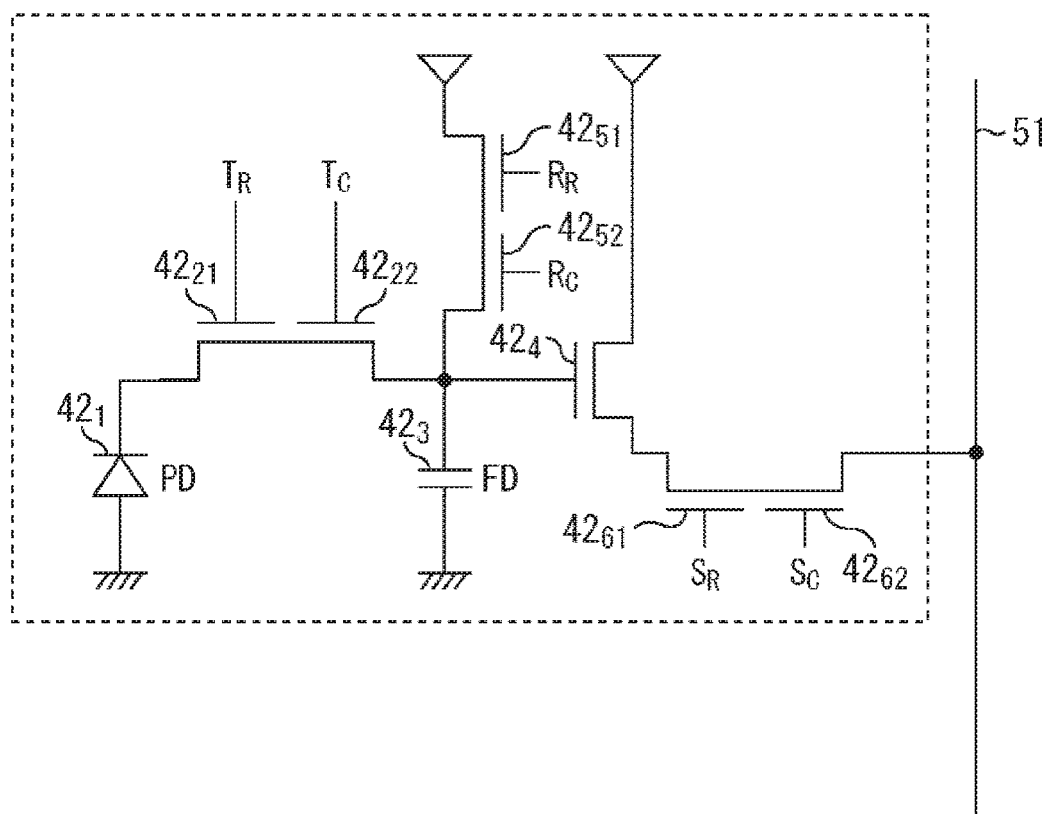
FIG. 29 is an equivalent circuit diagram that corresponds to the third configuration example of a pixel.

Next, FIG. 29 illustrates an equivalent circuit diagram that corresponds to a fourth configuration example of the pixel 42 arranged on the imaging surface 40 of the image sensor 23.

In the fourth configuration example of the pixel 42, the row selection switch $42_6$ of the third configuration example illustrated in FIG. 27 is replaced by multi-bit selection switches $42_{61}$ and $42_{62}$, the column selection switch 52 is stopped, and the column selection signal line $S_C$ connected to the column selection switch 52 is connected to the selection switch $42_{62}$. The other constituent elements are common to those of the third configuration example, and the same reference numerals are assigned thereto.

The fourth configuration example of the pixel 42 may be operated similar to the third configuration example illustrated in FIG. 27.

<Application Example of Camera Monitoring System as Embodiment>

A camera monitoring system that is this embodiment, for example, may be applied to a security system detecting a suspicious person, a system analyzing the behavior of a worker in a factory or a shopping guest of a store, and the like.

In addition, an embodiment of the present disclosure is not limited to the embodiments described above, and various changes can be made in a range not departing from the concept of the present disclosure.

The present disclosure may also take the following configurations.

(1)

An imaging apparatus including:

an image sensor that includes an imaging surface in which many pixels are arranged vertically and horizontally;

a pixel control unit that controls the image sensor, selects a pixel corresponding to a sampling function among pixels configuring a block by applying the sampling function for each block acquired by partitioning the imaging surface of the image sensor into a plurality of blocks, and outputs a sampling signal based on a pixel value of the selected pixel; and a reduced image generating unit that generates a reduced image on the basis of the sampling signal for each block output from the image sensor.

(2)

The imaging apparatus according to (1), in which the image sensor selects one pixel corresponding to the sampling function among the pixels configuring the block and outputs a pixel value of the selected one pixel as the sampling signal in accordance with control from the pixel control unit.

(3)

The imaging apparatus according to (1) or (2), in which the image sensor selects one pixel corresponding to the sampling function among the pixels configuring the block in accordance with a row selection signal and a column selection signal supplied from the pixel control unit.

(4)

The imaging apparatus according to (3), in which each pixel of the image sensor includes a multi-bit transfer switch that performs switching on the basis of the row selection signal and the column selection signal supplied from the pixel control unit.

(5)

The imaging apparatus according to (4), in which the image sensor randomly selects one pixel among the pixels configuring the block in space and time in accordance with a row selection signal and a column selection signal supplied from the pixel control unit.

(6)

The imaging apparatus according to (1), in which the image sensor selects a plurality of pixels corresponding to the sampling function among the pixels configuring the block and outputs an added value acquired by adding pixel values of the plurality of selected pixels as the sampling signal in accordance with control from the pixel control unit.

(7)

The imaging apparatus according to (1) or (5), in which the image sensor includes:

an analog adder that adds pixel values of the pixels selected according to the row selection signal and the column selection signal supplied from the pixel control unit for each row; and an ADC unit that sequentially adds outputs of each row from the analog adder as digital values.

(8)

The imaging apparatus according to (7), in which each pixel of the image sensor includes a multi-bit transfer switch that performs switching on the basis of the row selection signal and the column selection signal supplied from the pixel control unit.

(9)

The imaging apparatus according to (8), in which the image sensor randomly selects a plurality of pixels among the pixels configuring the block in space and time in accordance with a row selection signal and a column selection signal supplied from the pixel control unit.

(10)

The imaging apparatus according to (1), in which the image sensor selects a plurality of pixels corresponding to the sampling function among the pixels configuring the block and outputs an added value acquired by adding pixel values of the plurality of selected pixels with a positive or negative sign added as the sampling signal in accordance with control from the pixel control unit.

(11)

The imaging apparatus according to (1) or (10), in which the image sensor includes:

an analog adder that adds pixel values of the pixels selected according to the row selection signal and the column selection signal supplied from the pixel control unit for each row;

a sign inverter that inverts sign of an output from the analog adder; and an ADC unit that sequentially adds outputs of each row from the analog adder or the sign inverter as digital values.

(12)

The imaging apparatus according to (11), in which each pixel of the image sensor includes a multi-bit transfer switch that performs switching on the basis of the row selection signal and the column selection signal supplied from the pixel control unit.

(13)

The imaging apparatus according to (12), in which the image sensor randomly selects a plurality of pixels among the pixels configuring the block in space and time in accordance with the row selection signal and the column selection signal supplied from the pixel control unit.

(14)

The imaging apparatus according to (1), in which the pixel control unit controls the image sensor, selects a pixel corresponding to a common sampling function among pixels configuring a block by applying the common sampling function for each block acquired by partitioning the imaging surface of the image sensor into a plurality of blocks, and outputs a sampling signal based on a pixel value of the selected pixel; and the reduced image generating unit generates the reduced image on the basis of the sampling signal for each block, to which the common sampling function is applied, output from the image sensor.

(15)

The imaging apparatus according to (1), in which the pixel control unit controls the image sensor, selects a pixel corresponding to a common sampling function or a non-common sampling function among pixels configuring a block by applying the common sampling function or the non-common sampling function other than the common sampling function for each block acquired by partitioning the imaging surface of the image sensor into a plurality of blocks, and outputs a sampling signal based on a pixel value of the selected pixel; and the reduced image generating unit generates the reduced image by resampling the sampling signal on the basis of the common sampling function, from a storage unit storing the sampling signal of each block, to which the common sampling function or the non-common sampling function is applied, output from the image sensor.

(16)

The imaging apparatus according to any of (1) to (15), further including a feature detecting unit that performs a feature detecting process for the reduced image.

(17)

The imaging apparatus according to any of (1) to (16), further including an area cutting-out unit that cuts out the sampling signal of each block corresponding to an area in which a feature is detected by the feature detecting process from an output of the image sensor and outputs the cut-out sampling signal to a later stage.

(18)

The imaging apparatus according to (17), in which the area cutting-out unit cuts out an area in which a feature is detected by the feature detecting process from the reduced image formed from the output of the image sensor and outputs the cut-out area to a later stage.

(19)

The imaging apparatus according to (17), in which the pixel control unit controls the image sensor, selects a pixel corresponding to a common sampling function or a non-common sampling function among pixels configuring a block by applying the non-common sampling function other than the common sampling function for a block corresponding to an area in which a feature is detected by the feature detecting process among blocks acquired by partitioning the imaging surface of the image sensor into a plurality of blocks and applying the common sampling function for a block corresponding to an area in which a feature is not detected by the feature detecting process, and outputs a sampling signal based on a pixel value of the selected pixel, and the area cutting-out unit cuts out the sampling signal of the block, to which the non-common sampling function is applied, corresponding to an area in which a feature is detected by the feature detecting process from the output of the image sensor and outputs the cut-out sampling signal to a later stage.

(20)

An information processing system including:

one or more imaging apparatuses; and an information processing apparatus connected to the imaging apparatuses through a network, in which the imaging apparatus includes:

an image sensor that includes an imaging surface in which many pixels are arranged vertically and horizontally;

a pixel control unit that controls the image sensor, selects a pixel corresponding to a sampling function among pixels configuring a block by applying the sampling function for each block acquired by partitioning the imaging surface of the image sensor into a plurality of blocks, and outputs a sampling signal based on a pixel value of the selected pixel;

a reduced image generating unit that generates a reduced image on the basis of the sampling signal for each block output from the image sensor;

a feature detecting unit that performs a feature detecting process for the reduced image; and an area cutting-out unit that cuts out the sampling signal of each block corresponding to an area in which a feature is detected by the feature detecting process from an output of the image sensor and transmits the cut-out sampling signal to the information processing apparatus through the network; and the information apparatus includes an information processing unit that performs a predetermined information process for the output of the information processing apparatus transmitted through the network.

REFERENCE SIGNS LIST

10 Camera monitoring system
11 Network
12 Behavior analyzing apparatus
20 Imaging apparatus
21 Sampling function storing unit
22 Pixel control unit
23 Image sensor
24 Image sensor output storing unit
25 Feature detecting unit
26 Area cutting-out unit
30 Determination server
31 Imaging apparatus output storing unit
32 Image reconfiguring unit
33 Sampling function storing unit
34 Identification determining unit
35 Determination DB
36 Determination result DB
40 Imaging surface
41 Block
42 Pixel

The invention claimed is:

1. An imaging apparatus, comprising:
an image sensor that includes an imaging surface,
wherein the imaging surface includes a plurality of pixels in at least one of a vertical arrangement or a horizontal arrangement; and
circuitry configured to:
control the image sensor;
acquire a plurality of blocks based on partition of the imaging surface, wherein each block of the plurality of blocks includes a set of pixels of the plurality of pixels;
select the set of pixels based on a sampling function of a respective block of the plurality of blocks,
wherein the sampling function indicates a position of the selected set of pixels in the respective block of the plurality of blocks;
acquire a value, based on addition of pixel values of the selected set of pixels with one of a positive sign or a negative sign;
output a sampling signal for each block of the plurality of blocks based on the acquired value of the selected set of pixels of the respective block of the plurality of blocks; and
generate a reduced image based on the sampling signal for the each block of the plurality of blocks.

2. The imaging apparatus according to claim 1, wherein the circuitry is further configured to output the acquired value of the selected set of pixels as the sampling signal.

3. The imaging apparatus according to claim 1, wherein the circuitry is further configured to select the set of pixels based on a row selection signal and a column selection signal, and
each of the row selection signal and the column selection signal is associated with the sampling function.

4. The imaging apparatus according to claim 3, wherein each pixel of the plurality of pixels includes a multi-bit transfer switch, and
the multi-bit transfer switch is configured to switch the plurality of pixels based on the row selection signal and the column selection signal.

5. The imaging apparatus according to claim 4, wherein the image sensor randomly selects one pixel among the pixels configuring the each block in space and time in accordance with the row selection signal and the column selection signal supplied from the circuitry.

6. The imaging apparatus according to claim 1, wherein the image sensor selects the set of pixels corresponding to the sampling function among the pixels configuring the each block and outputs an added value acquired by adding pixel values of the plurality of selected pixels as the sampling signal in accordance with control from the circuitry.

7. The imaging apparatus according to claim 6, wherein the image sensor includes: an analog adder that adds pixel values of the pixels selected according to a row selection signal and a column selection signal supplied from the circuitry for each row; and an analog to digital converter (ADC) that sequentially adds outputs of each row from the analog adder as the digital values.

8. The imaging apparatus according to claim 7, wherein each pixel of the image sensor includes a multi-bit transfer switch configured to switch based on the row selection signal and the column selection signal supplied from the circuitry.

9. The imaging apparatus according to claim 8, wherein the image sensor randomly selects the set of pixels among the pixels configuring the each block in space and time in accordance with the row selection signal and the column selection signal supplied from the circuitry.

10. The imaging apparatus according to claim 1, wherein the circuitry is further configured to:
add the pixel values of the set of pixels in a row of the each block of the plurality of blocks based on a row selection signal and a column selection signal;
invert a sign of the pixel values of the set of pixels in the row of the each block of the plurality of blocks; and
sequentially add outputs from the plurality of blocks based on one of the added pixel values or the inverted sign of the pixel values.

11. The imaging apparatus according to claim 10, wherein each pixel of the set of pixels includes a multi-bit transfer switch, and
the multi-bit transfer switch is configured to switch the set of pixels based on the row selection signal and the column selection signal.

12. The imaging apparatus according to claim 11, wherein the circuitry is further configured to select the plurality of pixels based on the row selection signal and the column selection signal.

13. The imaging apparatus according to claim 1, wherein the circuitry is further configured to:
select the set of pixels based on a common sampling function of the plurality of blocks; and
generate the reduced image based on the common sampling function.

14. The imaging apparatus according to claim 1,
wherein the circuitry controls the image sensor, selects a pixel corresponding to a common sampling function or a non-common sampling function among pixels configuring a block by applying the common sampling function or the non-common sampling function other than the common sampling function for the each block acquired by partitioning the imaging surface of the image sensor into the plurality of blocks, and outputs the sampling signal based on the acquired value of the selected set of pixels; and
the circuitry generates the reduced image by resampling the sampling signal on the basis of the common sampling function, from a storage storing the sampling signal of the each block, to which the common sampling function or the non-common sampling function is applied, output from the image sensor.

15. The imaging apparatus according to claim 1, wherein the circuitry is further configured to execute a feature detecting process for the reduced image.

16. The imaging apparatus according to claim 15, wherein the circuitry is further configured to:
detect an area of the reduced image based on the feature detecting process;
cut-out the sampling signal of the each block of the plurality of blocks corresponding to the detected area; and
output the cut-out sampling signal to an information processing apparatus.

17. The imaging apparatus according to claim 16, wherein the circuitry is further configured to:
cut-out the detected area from the reduced image; and
output the cut-out area to the information processing apparatus.

18. The imaging apparatus according to claim 16,
wherein the circuitry controls the image sensor, selects a pixel corresponding to a common sampling function or a non-common sampling function among pixels configuring a block by applying the non-common sampling function other than the common sampling function for the block corresponding to an area in which a feature is detected by the feature detecting process among blocks acquired by partitioning the imaging surface of the image sensor into the plurality of blocks and applying the common sampling function for the block corresponding to an area in which a feature is not detected by the feature detecting process, and outputs the sampling signal based on the acquired value of the selected set of pixels, and
the circuitry cuts out the sampling signal of the block, to which the non-common sampling function is applied, corresponding to the area in which a feature is detected by the feature detecting process from the output of the image sensor and outputs the cut-out sampling signal to a later stage.

19. An information processing system, comprising:
at least one imaging apparatus that includes an image sensor and circuitry, wherein
the image sensor includes an imaging surface, and
the imaging surface includes a plurality of pixels in at least one of a vertical arrangement or a horizontal arrangement; and
an information processing apparatus connected to the at least one imaging apparatus through a network, wherein
the circuitry is configured to:
control the image sensor;
acquire a plurality of blocks based on partition of the imaging surface, wherein each block of the plurality of blocks includes a set of pixels of the plurality of pixels;
select the set of pixels based on a sampling function of a respective block of the plurality of blocks, wherein the sampling function indicates a position of the selected set of pixels in the respective block of the plurality of blocks;
acquire a value, based on addition of pixel values of the selected set of pixels with one of a positive sign or a negative sign;
output a sampling signal for each block of the plurality of blocks based on the acquired value of the selected set of pixels of the respective block of the plurality of blocks;
generate a reduced image based on the sampling signal for each block of the plurality of blocks;
execute a feature detecting process for the reduced image;
detect an area of the reduced image based on the feature detecting process;
cut-out the sampling signal of each block of the plurality of blocks corresponding to the detected area; and
transmit the cut-out sampling signal of the each block of the plurality of blocks to the information processing apparatus through the network, and the information processing apparatus is configured to execute a specific information process based on the cut-out sampling signal.

\* \* \* \* \*